US012765693B2

(12) United States Patent
Zeng et al.

(10) Patent No.: US 12,765,693 B2
(45) Date of Patent: Oct. 20, 2026

(54) INFLATABLE PAD

(71) Applicant: BESTWAY INFLATABLES & MATERIAL CORP., Shanghai (CN)

(72) Inventors: Xianglin Zeng, Shanghai (CN); Qingshui Song, Shanghai (CN); Yihua You, Shanghai (CN); Bingrong Wu, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 145 days.

(21) Appl. No.: 18/524,350

(22) Filed: Nov. 30, 2023

(65) Prior Publication Data

US 2024/0398130 A1 Dec. 5, 2024

(30) Foreign Application Priority Data

May 30, 2023 (CN) ......................... 202321350931.5
May 30, 2023 (CN) ......................... 202321353446.3

(51) Int. Cl.
*A47C 27/08* (2006.01)
*B32B 5/02* (2006.01)
(Continued)

(52) U.S. Cl.
CPC .......... *A47C 27/087* (2013.01); *A47C 27/081* (2013.01); *B32B 5/02* (2013.01);
(Continued)

(58) Field of Classification Search
CPC ............................ A47C 27/087; A47C 27/081
(Continued)

(56) References Cited

U.S. PATENT DOCUMENTS 4,172,301 A * 10/1979 Everard ............... A47C 27/087 156/290
5,152,018 A * 10/1992 Lea ...................... A47C 27/088 5/709
(Continued)

FOREIGN PATENT DOCUMENTS

CN 107224139 10/2017
CN 217827338 11/2022
(Continued)

OTHER PUBLICATIONS

Extended European Search Report dated Jun. 4, 2024 (Jun. 4, 2024), 7 pages, issued on related European patent application 24154907.0 by the European Patent Office.
(Continued)

*Primary Examiner* — Justin C Mikowski
*Assistant Examiner* — George Samuel Gines
(74) *Attorney, Agent, or Firm* — Dickinson Wright PLLC

(57) ABSTRACT

An inflatable pad includes a top sheet and a bottom sheet, connected to the top sheet to jointly define an inflatable chamber. The top and bottom sheets may each include an outer layer, an inner layer, and a heat insulation film disposed between the inner and outer layers. The top and bottom sheets may be welded together at a plurality of positions. A connecting sheet may be provided within the inflatable chamber and welded to the top and bottom sheets, respectively, at a plurality of first welding regions and a plurality of second welding regions, respectively. A heat insulation film may be disposed in the inflatable chamber between the top and bottom sheets, between the top sheet and the connecting sheet, and/or between the bottom sheet and the connecting sheet. A lateral confining sheet may be provided having top and bottom edges, respectively connected to the top and bottom sheets.

28 Claims, 16 Drawing Sheets

(51) Int. Cl.
*B32B 27/08* (2006.01)
*B32B 27/12* (2006.01)

(52) U.S. Cl.
CPC .............. *B32B 27/08* (2013.01); *B32B 27/12* (2013.01); *B32B 2255/10* (2013.01); *B32B 2255/205* (2013.01); *B32B 2479/00* (2013.01)

(58) Field of Classification Search
USPC ............................................. 5/420, 700, 706
See application file for complete search history.

(56) References Cited

U.S. PATENT DOCUMENTS

| | | | | |
|---|---|---|---|---|
| 5,669,092 | A * | 9/1997 | Lin | B32B 15/08<br>5/709 |
| 7,244,483 | B2 * | 7/2007 | Tawney | B29D 22/02<br>36/35 B |
| 9,609,956 | B1 * | 4/2017 | Lin | A47C 27/081 |
| 2006/0260945 | A1 * | 11/2006 | Miyake | G11B 5/3163<br>205/135 |
| 2007/0044243 | A1 * | 3/2007 | Metzger | A47C 27/087<br>5/710 |
| 2010/0083417 | A1 * | 4/2010 | Alder | B32B 5/22<br>5/420 |
| 2012/0284923 | A1 * | 11/2012 | Jensen | A61G 1/00<br>5/625 |
| 2017/0224125 | A1 * | 8/2017 | Lin | B29C 66/439 |
| 2017/0273472 | A1 * | 9/2017 | Liu | A47C 27/081 |

FOREIGN PATENT DOCUMENTS

| | | |
|---|---|---|
| CN | 217827338 U * | 11/2022 |
| CN | 217827340 | 11/2022 |

OTHER PUBLICATIONS

Extended European Search Report dated Jun. 3, 2024 (Jun. 3, 2024), 6 pages, issued on related European Patent Application 23220699.5 by the European Patent Office.

* cited by examiner

INFLATABLE PAD

CROSS-REFERENCE TO RELATED APPLICATION

This Application claims priority from Chinese Application CN202321350931.5 filed May 30, 2023 in China and from Chinese Application CN202321353446.3 filed May 30, 2023 in China, the disclosures of which are incorporated herein by reference in their entireties. BACKGROUND

1. Field

Example embodiments relate to an inflatable pad, and in particular to an inflatable pad for wild camping.

2. Description of Related Art

When camping in the wild, due to the cold and hard ground, campers often want a conveniently portable inflatable pad that provides heat insulation and cushioning. Such an inflatable pad plays an important role in reducing heat transfer between a camper and the surface on which the inflatable pad is placed. Typically, a camper sleeps on top of a top sheet of an inflatable pad, and the inflatable pad is placed with its bottom sheet on the ground. If an inflatable pad can successfully prevent or significantly reduce the heat transfer between its top sheet and its bottom sheet (in other words, the inflatable pad has good heat insulation performance), thereby avoiding the impact of low temperature from the ground on the camper, the camper can retain sufficient heat, thereby enjoying comfortable sleep and being adequately prepared for activities the next day. The heat insulation performance of an inflatable pad can be represented by an R-value (thermal resistance value). The R-value can be tested using a standard testing method, such as testing according to the American Society for Testing and Materials (ASTM) F3340-18 standard. The larger the R-value, the better the heat insulation performance of the inflatable pad. Manufacturers recommend a suitable environment for the inflatable pad to a user on the basis of the tested R-value of the inflatable pad. An inflatable pad with a low R-value is suitable only for a warmer environment, while an inflatable pad with a high R-value is suitable for a colder environment.

An inflatable pad typically comprises the top sheet and the bottom sheet connected to each other to form an inflatable chamber therebetween. To achieve a better heat insulation performance (higher R-value), some inflatable pads have heat insulation cotton or aluminum-plated films arranged within the inflatable chambers. An aluminum-plated film used in inflatable pads on the market are typically formed by single-sided aluminum plating on a PET (polyethylene terephthalate) film. Since an aluminum-plated PET film cannot be welded to the top sheet or the bottom sheet by using methods such as high frequency or hot pressing, before the aluminum-plated film is arranged within the inflatable chamber, the aluminum-plated film should be perforated, so that the top sheet and the bottom sheet can be welded to each other through the perforations in the aluminum-plated film, eliminating the need to include the aluminum-plated film, which cannot be welded to the top sheet or the bottom sheet, in a welding process. As shown in FIG. 1, in a mass production process of inflatable pads, in order to improve production efficiency, a plurality of single-sided aluminum-plated films 1 may be stacked together, and batch perforation operations are performed on the plurality of single-sided aluminum-plated films using a laser cutting head 2. However, in the process of laser cutting the plurality of single-sided aluminum-plated films, edges 4 of the perforations 3 tend to stick together due to heat affecting the single-sided aluminum-plated films, and separating these aluminum-plated films later may result in tearing or damage to adhesive positions of the films, thereby reducing the yield.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, an inflatable pad comprises: a top sheet and a bottom sheet connected to the top sheet, such that the top sheet and the bottom sheet jointly define an inflatable chamber therebetween; wherein at least one of the top sheet and the bottom sheet comprises: an outer layer comprising a fabric layer facing away from the inflatable chamber, an inner layer facing the inflatable chamber, the inner layer comprising a polymer material layer, and a heat insulation film disposed between the outer layer and the inner layer, the heat insulation film comprising a polymer substrate and a metal plating layer plated on the polymer substrate.

The inflatable pad may further comprise: a connecting sheet disposed within the inflatable chamber between the top sheet and the bottom sheet, the connecting sheet comprising: a plurality of first welding regions and a plurality of second welding regions staggered with respect to the plurality of first welding regions, wherein the plurality of first welding regions are welded to the top sheet and the plurality of second welding regions are welded to the bottom sheet.

The inflatable pad may further comprise: at least one heat insulation sheet disposed within the inflatable chamber, wherein the heat insulation sheet comprises a polymer substrate and a metal plating layer plated on the polymer substrate.

The at least one heat insulation sheet may be disposed between the top sheet and the connecting sheet and may comprise a plurality of openings, wherein each of the plurality of openings is configured to allow a corresponding one of the plurality of first welding regions to be in contact with and welded to the top sheet.

The at least one heat insulation sheet may be arranged between the connecting sheet and the bottom sheet and may comprise a plurality of openings, each of the plurality of openings being configured to allow a corresponding one of the plurality of second welding regions to be in contact with and welded to the bottom sheet.

The at least one heat insulation sheet may comprise a first heat insulation sheet and a second heat insulation sheet; wherein the first heat insulation sheet is disposed between the top sheet and the connecting sheet and comprises a plurality of first openings, wherein each of the plurality first openings is configured to allow a corresponding one of the plurality of first welding regions to be in contact with and welded to the top sheet; and wherein the second heat insulation sheet is disposed between the connecting sheet and the bottom sheet and comprises a plurality of second openings, wherein each of the plurality of second openings is configured to allow a corresponding one of the plurality of second welding regions to be in contact with and welded to the bottom sheet.

The outer layer may be a fabric layer, the inner layer may be a polymer material layer, and the heat insulation film may be bonded to the outer layer and the inner layer.

The metal plating layer may comprise a first metal plating layer plated on a front side of the polymer substrate and a second metal plating layer plated on a back side of the polymer substrate.

The polymer substrate may be made of one of polyvinyl chloride, polypropylene, and polyethylene terephthalate; and the metal plating layer is made of one of aluminum, zinc, copper, silver, and gold.

The polymer substrate may be made of polyethylene terephthalate, and the metal plating layer is made of aluminum.

The inner layer may be made of one of a thermoplastic polyurethane elastomer material, a polyvinyl chloride material, and a polyurethane material.

The top sheet may comprise a plurality of first welding regions and the bottom sheet comprises a plurality of second welding regions, wherein each of the plurality of first welding regions is welded to a corresponding one of the plurality of second welding regions.

The plurality of first welding regions may be evenly distributed on the top sheet and the plurality of second welding regions are evenly distributed on the bottom sheet.

The inflatable pad may further comprise: a lateral confining sheet; wherein a periphery of the top sheet is connected to a top edge of the lateral confining sheet, and a periphery of the bottom sheet is connected to a bottom edge of the lateral confining sheet, such that the bottom sheet is connected to the top sheet via the lateral confining sheet, and the top sheet, the bottom sheet, and the lateral confining sheet jointly define the inflatable chamber therebetween.

The top sheet and the bottom sheet may each comprise the outer later and the inner layer, and the inner layer of the top sheet and the inner layer of the bottom sheet are made of the same polymer material.

The polymer material may comprise thermoplastic polyurethane elastomer, polyvinyl chloride, or polyurethane.

The top sheet and the bottom sheet may each comprise the outer layer and the inner layer, and the inner layer of the top sheet, the inner layer of the bottom sheet, and the connecting sheet may be made of the same polymer material.

The polymer material may comprise thermoplastic polyurethane elastomer, polyvinyl chloride, or polyurethane.

The polymer substrate of the heat insulation film may be made of comprises polyvinyl chloride, polypropylene, or polyethylene terephthalate.

The polymer substrate of the heat insulation film may be made of one of polyvinyl chloride, polypropylene and polyethylene terephthalate, and the polymer substrate of the heat insulation sheet may be made of one of polyvinyl chloride, polypropylene and polyethylene terephthalate.

The metal plating layer of the heat insulation film may be made of aluminum, zinc, copper, silver, or gold.

The metal plating layer of the heat insulation film may be made of one of aluminum, zinc, copper, silver and gold, and the metal plating layer of the heat insulation sheet may be made of one of aluminum, zinc, copper, silver and gold.

The heat insulation film may have a thickness of 5 micrometers to 50 micrometers.

The heat insulation film may have a thickness of 5 micrometers to 50 micrometers, and the heat insulation sheet may have a thickness of 5 micrometers to 50 micrometers.

At least one of the plurality of first welding regions and the plurality of second welding regions may be evenly distributed on the connecting sheet.

The connecting sheet may further comprise a plurality of lightening holes, the plurality of lightening holes being staggered from the plurality of first welding regions and the plurality of second welding regions.

According to an aspect of another example embodiment, an inflatable pad comprises: a top sheet and a bottom sheet connected to the top sheet, such that the top sheet and the bottom sheet jointly define an inflatable chamber therebetween; a connecting sheet disposed within the inflatable chamber and comprising a plurality of first welding regions and a plurality of second welding regions staggered with respect to the plurality of first welding regions, wherein the plurality of first welding regions are welded to the top sheet and the plurality of second welding regions are welded to the bottom sheet.

At least one of the plurality of first welding regions and the plurality of second welding regions may be evenly distributed on the connecting sheet.

The connecting sheet may further comprise a plurality of lightening holes which are staggered with respect to both the plurality of first welding regions and the plurality of second welding regions.

At least one of the top sheet and the bottom sheet may comprise: an outer layer comprising a fabric layer facing away from the inflatable chamber, an inner layer facing the inflatable chamber, and a heat insulation film disposed between the outer layer and the inner layer, the heat insulation film comprising a polymer substrate and a metal plating layer plated on the polymer substrate.

The inner layer and the connecting sheet may be made of one of a thermoplastic polyurethane elastomer material, a polyvinyl chloride material, and a polyurethane material.

The outer layer may be a fabric layer, the inner layer may be a polymer material layer, and the heat insulation film may be bonded to the outer layer and the inner layer.

The metal plating layer may comprise a first metal plating layer plated on a front side of the polymer substrate and a second metal plating layer plated on a back side of the polymer substrate.

The polymer substrate may be made of one of polyvinyl chloride, polypropylene, and polyethylene terephthalate; and the metal plating layer is made of one of aluminum, zinc, copper, silver, and gold.

The polymer substrate may be made of polyethylene terephthalate, and the metal plating layer is made of aluminum.

The inner layer may be made of one of a thermoplastic polyurethane elastomer material, a polyvinyl chloride material, and a polyurethane material.

The inflatable pad of this example embodiment may further comprise: a lateral confining sheet; wherein a periphery of the top sheet is connected to a top edge of the lateral confining sheet, and a periphery of the bottom sheet is connected to a bottom edge of the lateral confining sheet, such that the bottom sheet is connected to the top sheet via the lateral confining sheet, and the top sheet, the bottom sheet, and the lateral confining sheet jointly define the inflatable chamber therebetween.

According to an aspect of another example embodiment, an inflatable pad comprises: a top sheet and a bottom sheet connected to the top sheet, such that the top sheet and the bottom sheet jointly define an inflatable chamber therebetween; and at least one heat insulation sheet disposed within the inflatable chamber and comprising a polymer substrate and a metal plating layer plated on the polymer substrate, wherein the metal plating layer comprises a first metal plating layer plated on a front side of the polymer substrate and a second metal plating layer plated on a back side of the polymer substrate.

The inflatable pad of this example embodiment may further comprise: a connecting sheet disposed within the inflatable chamber and comprising a plurality of first welding regions and a plurality of second welding regions staggered with respect to the plurality of first welding regions, wherein the plurality of first welding regions are welded to the top sheet, and the plurality of second welding regions are welded to the bottom sheet.

The at least one heat insulation sheet may be disposed between the top sheet and the connecting sheet and may comprise a plurality of openings, wherein each of the plurality of openings is configured to allow a corresponding one of the plurality of first welding regions to be in contact with and welded to the top sheet.

The at least one heat insulation sheet may be disposed between the connecting sheet and the bottom sheet and may comprise a plurality of openings, wherein each of the plurality of openings is configured to allow a corresponding one of the plurality of second welding regions to be in contact with and welded to the bottom sheet.

The at least one heat insulation sheet may comprise: a first heat insulation sheet and a second heat insulation sheet; wherein the first heat insulation sheet is disposed between the top sheet and the connecting sheet and comprises a plurality of first openings, wherein each of the plurality first openings is configured to allow a corresponding one of the plurality of first welding regions to be in contact with and welded to the top sheet; and wherein the at least one second heat insulation sheet is disposed between the connecting sheet and the bottom sheet and comprises a plurality of second openings, wherein each of the plurality of second openings is configured to allow a corresponding one of the plurality of second welding regions to be in contact with and welded to the bottom sheet.

At least one of the plurality of first welding regions and the plurality of second welding regions may be evenly distributed on the connecting sheet.

The connecting sheet may further comprise a plurality of lightening holes which are staggered with respect to both the plurality of first welding regions and the plurality of second welding regions.

Each of the top sheet and the bottom sheet may comprise: an outer layer comprising a fabric layer facing away from the inflatable chamber; and an inner layer facing the inflatable chamber; wherein each of the inner layer of the top sheet, the inner layer of the bottom sheet, and the connecting sheet is made of a same polymer material.

Each of the inner layer of the top sheet, the inner layer of the bottom sheet, and the connecting sheet may be made of one of a thermoplastic polyurethane elastomer material, a polyvinyl chloride material, and a polyurethane material.

At least one of the top sheet and the bottom sheet may comprise: an outer layer facing away from the inflatable chamber, an inner layer facing the inflatable chamber, and a heat insulation film disposed between the outer layer and the inner layer, wherein the heat insulation film comprises a polymer substrate and a metal plating layer plated on at least one of a front side of the polymer substrate and a back side of the polymer substrate.

The outer layer may be a fabric layer, the inner layer may be a polymer material layer, and the heat insulation film may be bonded to the outer layer and the inner layer.

The inflatable pad of this example embodiment may further comprise: a lateral confining sheet; wherein a periphery of the top sheet is connected to a top edge of the lateral confining sheet, and a periphery of the bottom sheet is connected to a bottom edge of the lateral confining sheet, such that the top sheet, the bottom sheet, and the lateral confining sheet jointly define the inflatable chamber therebetween.

The polymer may be made of one of polyvinyl chloride, polypropylene, and polyethylene terephthalate; and the metal plating layer may be made of one of aluminum, zinc, copper, silver, and gold.

The polymer substrate may be made of polyethylene terephthalate, and the metal plating layer may be made of aluminum.

The heat insulation sheet may have a thickness of 5 micrometers to 50 micrometers.

The metal plating layer may have a thickness of 100 angstroms to 800 angstroms.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
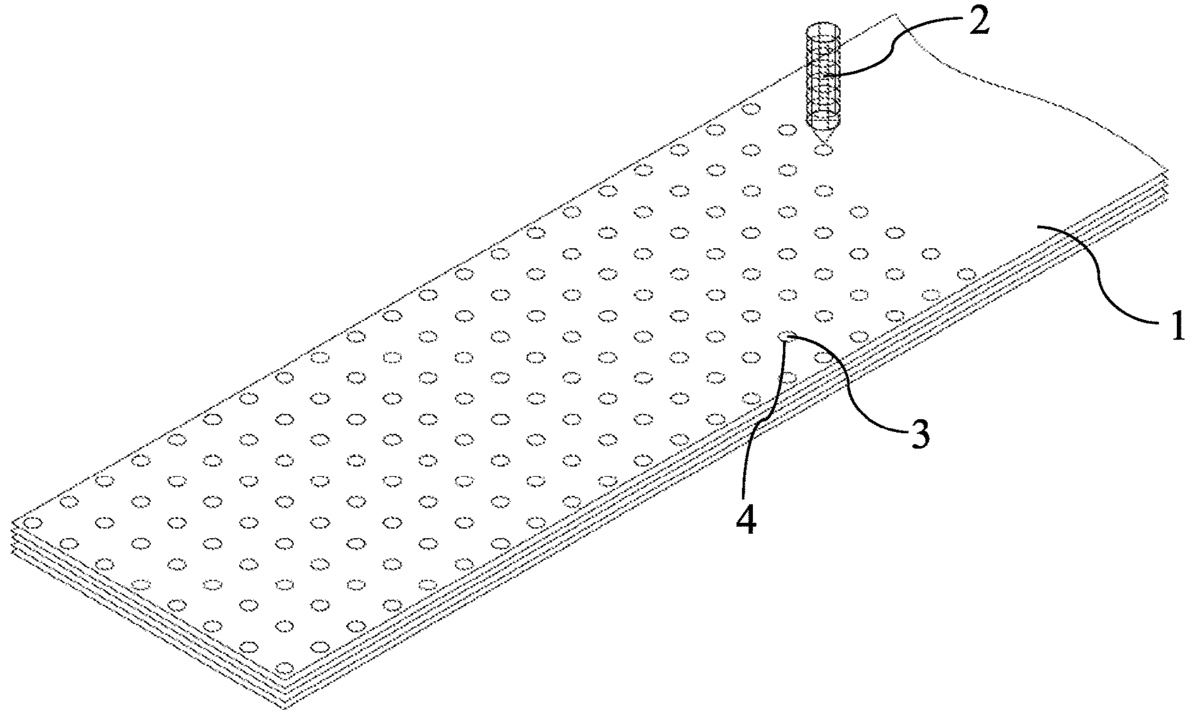
FIG. 1 is a schematic diagram of simultaneously perforating multiple single-sided aluminum-plated films according to the related art.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms "include," "including", "comprise, and/or "comprising," when used in this specification, specify the presence of stated features, integers, steps, operations, elements, and/or components, but do not preclude the presence or addition of one or more other features, integers, steps, operations, elements, components, and/or groups thereof.

It will be further understood that, although the terms "first," "second," "third," etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term "and/or" includes any and all combinations of one or more of the associated listed items. Expressions such as "at least one of," when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

In the description, the expression of the structural positions of various components, such as upper, lower, top, and bottom, are not absolute but relative. The orientation expressions are appropriate when the various components are arranged as shown in the figures, but should change accordingly when the positions of the various components in the figures change.

FIG. 2 through FIG. 4C illustrate an inflatable pad 100 and components thereof according to a first example embodiment.

Figure 2:
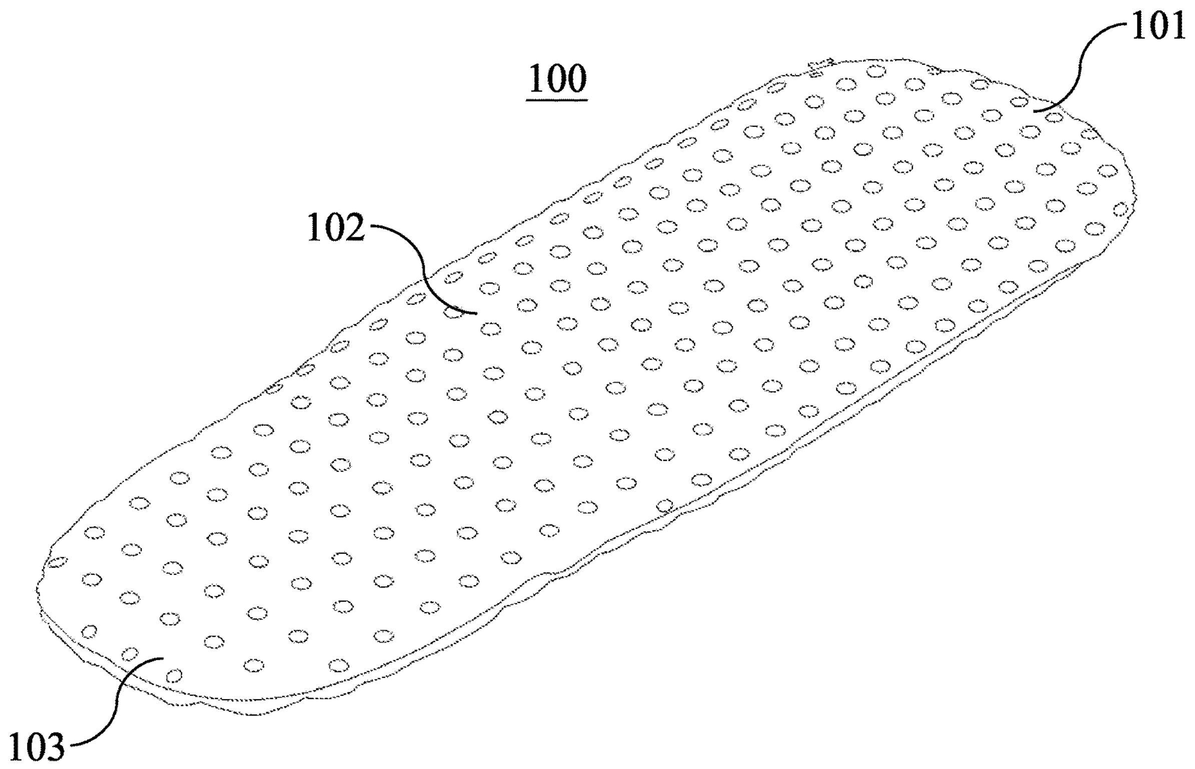
FIG. 2 is a schematic perspective view of an inflatable pad according to a first example embodiment.
Figure 3:
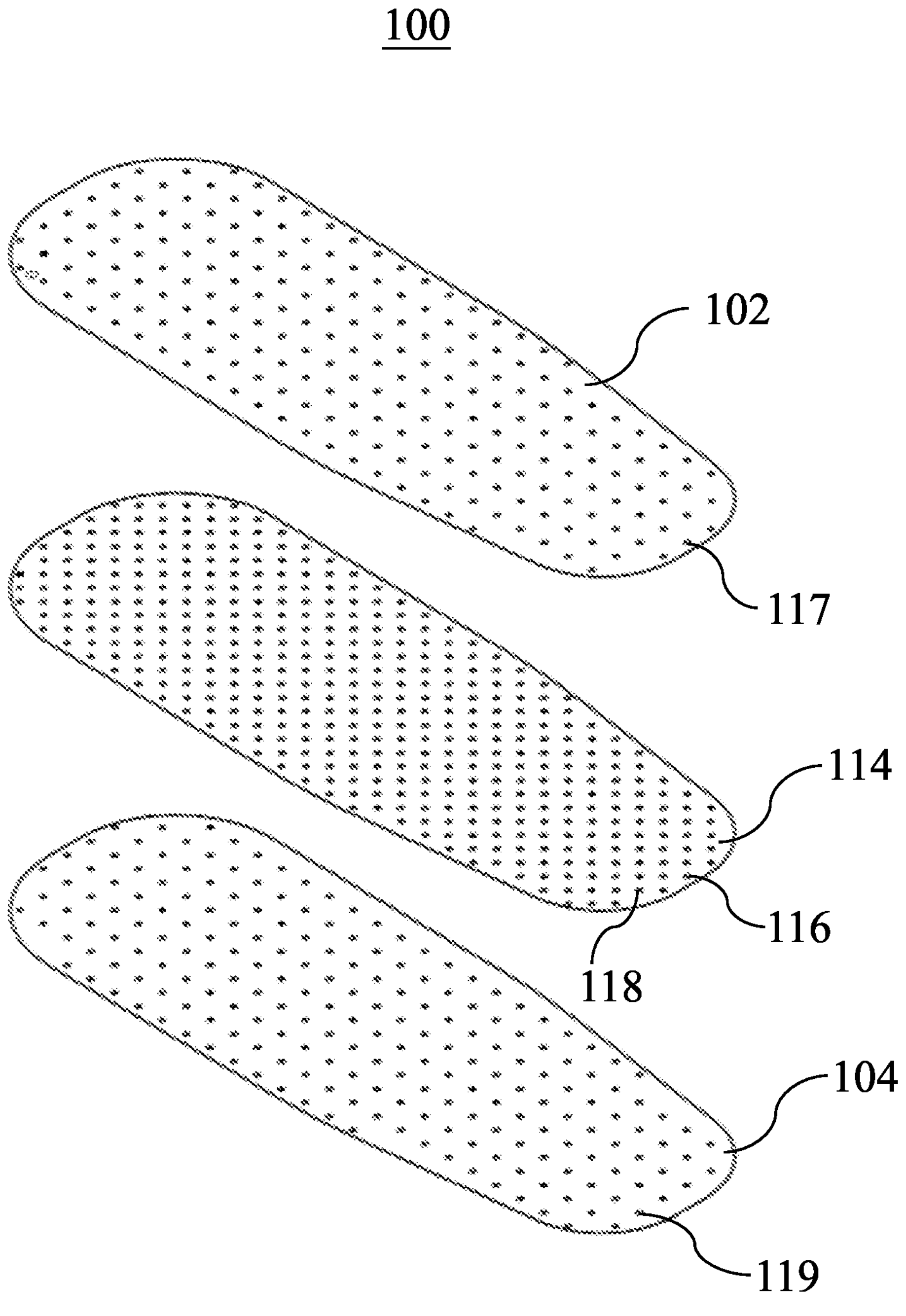
FIG. 3 is a schematic exploded view of an inflatable pad according to a first example embodiment.
Figure 4A:
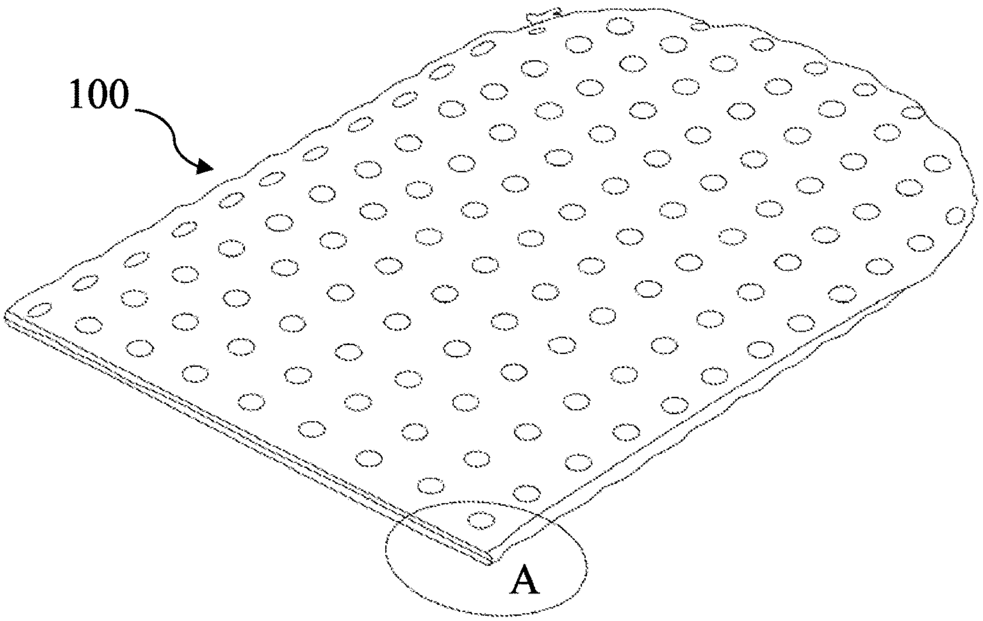
FIG. 4A is a partial schematic diagram of an inflatable pad according to the first example embodiment.
Figure 4B:
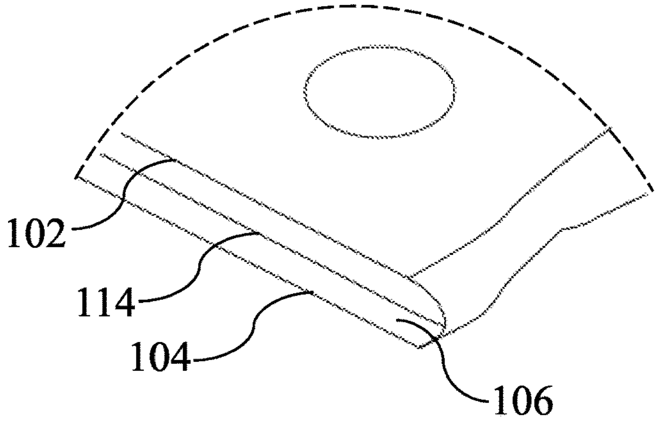
FIG. 4B is a schematic enlarged view of region A of FIG. 4A.
Figure 4C:
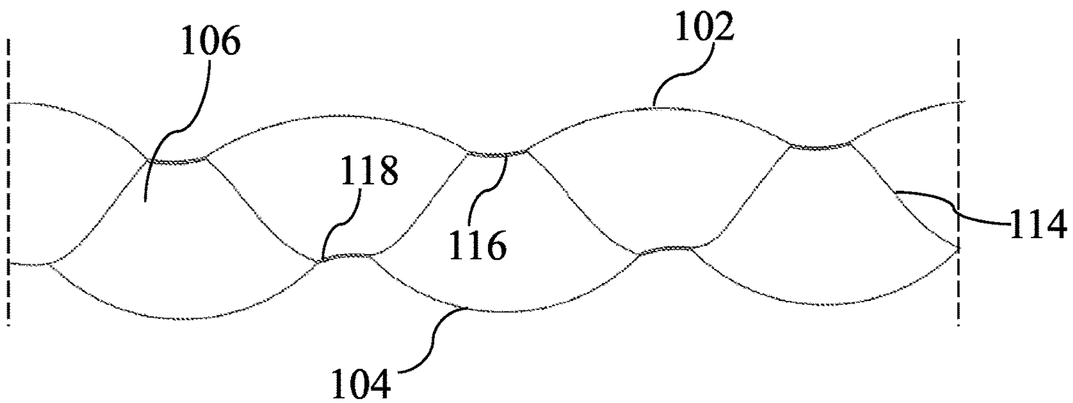
FIG. 4C is a partial sectional view of the inflatable pad of FIG. 4A.

With reference to FIG. 2, the inflatable pad 100 comprises a head portion 101 for supporting the head of a user and a tail portion 103 for supporting the feet of the user. In the example embodiment shown in FIG. 2, the head portion 101 of the inflatable pad 100 has a width greater than that of the tail portion 103 of the inflatable pad 100, so that the inflatable pad 100 has a shape that is wider at the head portion and narrower at the tail portion, resembling a cone shape as a whole. It should be understood, however, that this is merely an example, and that the inflatable pad may alternately have another suitable shape such as a rectangle or an oval.

With reference to FIG. 2 through FIG. 4C, the inflatable pad 100 comprises a top sheet 102 and a bottom sheet 104. The top sheet 102 and the bottom sheet 104 are connected to each other to form an inflatable chamber 106 therebetween. The top sheet 102 is configured for the user to sit or lie on, and the bottom sheet 104 is configured to be in contact with the ground. The top sheet 102 and the bottom sheet 104 may have substantially the same shapes and sizes, and a periphery of the top sheet 102 may be welded to a periphery of the bottom sheet 104 to form the inflatable chamber 106 between the top sheet 102 and the bottom sheet 104. At least one of the top sheet 102 and the bottom sheet 104 may comprise a plurality of layers, for example, including an outer layer away from the inflatable chamber 106 and an inner layer facing the inflatable chamber 106. The outer layer may be a fabric layer to provide a comfortable touch (the outer layer may also be referred to as a comfort layer). The outer layer may be a non-flocked fabric layer or a flocked fabric layer. The inner layer may be a polymer material layer, and can be made of thermoplastic polyurethane elastomer (TPU), polyvinyl chloride (PVC), polyurethane (PU), or other suitable polymer materials.

Figure 5A:
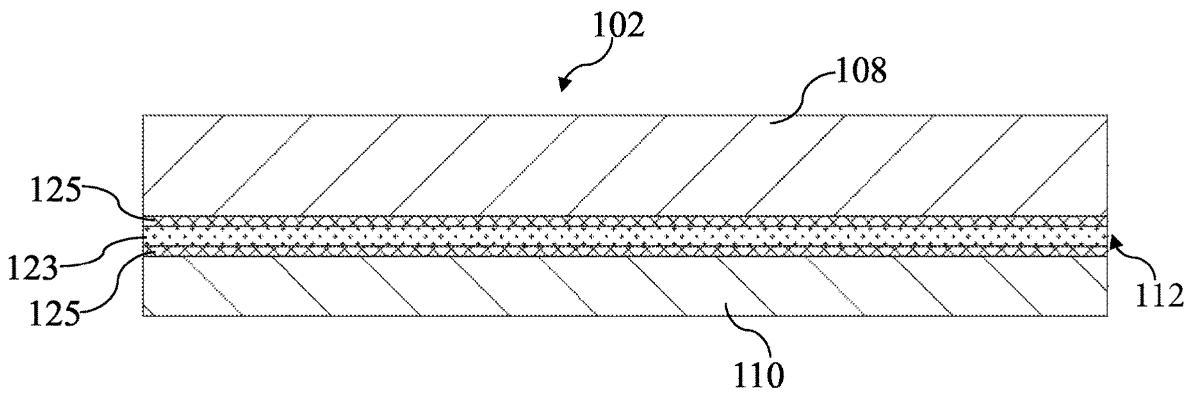
FIG. 5A is a schematic structural diagram of a first example of a top sheet of an inflatable pad according to the first example embodiment.
Figure 5B:
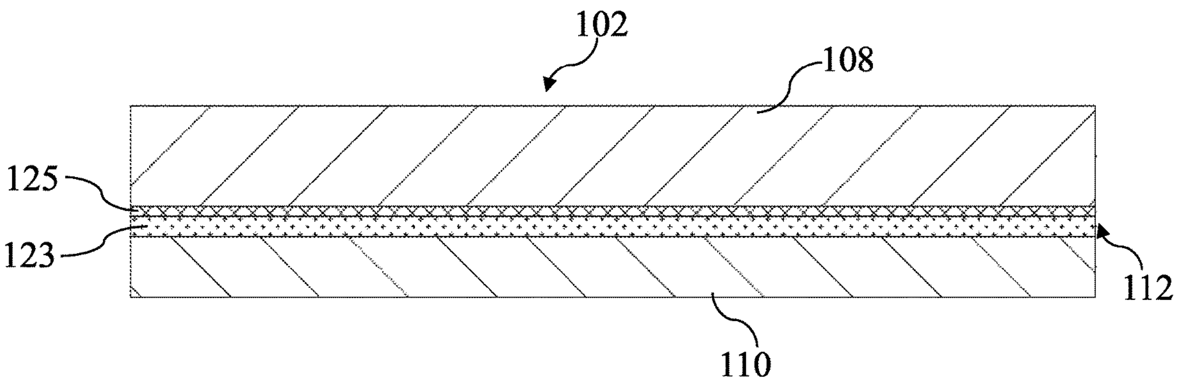
FIG. 5B is a schematic structural diagram of a second example of a top sheet of an inflatable pad according to the first example embodiment.
Figure 5C:
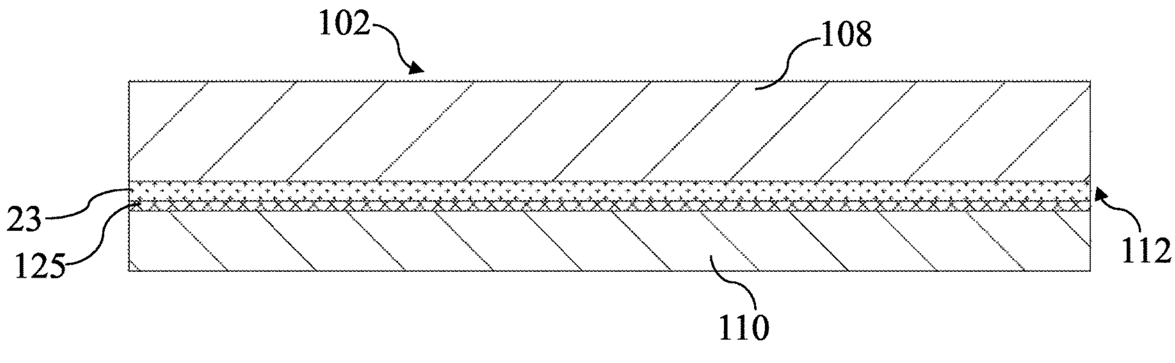
FIG. 5C is a schematic structural diagram of a third example of a top sheet of an inflatable pad according to the first example embodiment.

Optionally, a heat insulation film may be sandwiched between the outer layer and the inner layer, wherein the heat insulation film comprises a polymer substrate and a metal plating layer plated on at least one of a front side and a back side of the polymer substrate, which will be further described in detail below. The top sheet 102 and the bottom sheet 104 may have the same or different structures. FIG. 5A through FIG. 5C show a plurality of examples of the top sheet 102, and an example structure of the top sheet 102 will be described below with reference to FIG. 5A to FIG. 5C.

With reference to FIG. 5A, in a first example, the top sheet 102 comprises an outer layer 108 facing away from the inflatable chamber 106, an inner layer 110 facing the inflatable chamber 106, and a heat insulation film 112 sandwiched between the outer layer 108 and the inner layer 110. The heat insulation film 112 comprises a polymer substrate 123 and two metal plating layers 125 plated on a front side and a back side of the polymer substrate 123. In other words, the heat insulation film 112 of the top sheet 102 in FIG. 5A is double-sided metal-plated. Since thermal convection and thermal radiation are significant means of heat transfer in an inflatable pad, a double-sided metal-plated heat insulation film may effectively reflect thermal radiation. The heat radiated by the human body can be reflected back to the human body, reducing heat loss and significantly improving the heat insulation effect of the inflatable pad.

With reference to FIG. 5B, in a second example, the top sheet 102 comprises an outer layer 108 facing away from the inflatable chamber 106, an inner layer 110 facing the inflatable chamber 106, and a heat insulation film 112 sandwiched between the outer layer 108 and the inner layer 110. In this example, the heat insulation film 112 comprises a polymer substrate 123 and a metal plating layer 125 plated on a front side of the polymer substrate 123 (i.e., the surface of the polymer substrate 123 close to the outer layer 108). In other words, the heat insulation film 112 of the top sheet 102 of FIG. 5B is single-sided metal-plated.

With reference to FIG. 5C, in a third example, the top sheet 102 comprises an outer layer 108 facing away from the inflatable chamber 106, an inner layer 110 facing the inflatable chamber 106, and a heat insulation film 112 sandwiched between the outer layer 108 and the inner layer 110. In this example, the heat insulation film 112 comprises a polymer substrate 123 and a metal plating layer 125 plated on a back side of the polymer substrate 123 (i.e., the surface of the polymer substrate 123 close to the inner layer 110). In other words, the heat insulation film 112 of the top sheet 102 of FIG. 5C is single-sided metal-plated.

In some other examples, the top sheet of the inflatable pad may include only an outer layer and an inner layer, without including any single-sided metal-plated or double-sided metal-plated heat insulation film, while the structure of the bottom sheet may be similar to the structure of the top sheet as described in any of the above three examples, i.e., including an outer layer, an inner layer, and a heat insulation film. This will be more comprehensible from the following description.

With continued reference to FIG. 5A to FIG. 5C, the polymer substrate 123 of the heat insulation film 112 may be made of suitable polymer materials, such as polyvinyl chloride (PVC), polypropylene (PP), polyethylene terephthalate (PET), etc. The metal plating layer 125 of the heat insulation film 112 may be made of suitable metal materials such as aluminum, zinc, copper, silver, or gold. Further optionally, the polymer substrate 123 of the heat insulation film 112 may be made of PET, and the metal plating layer 125 of the heat insulation film 112 may be made of aluminum. Optionally, the heat insulation film 112 may be bonded to the outer layer 108 and the inner layer 110 with an adhesive to form a multi-layer composite structure.

The metal plating layer of the heat insulation film may have a thickness much smaller than that of its polymer substrate. Optionally, the heat insulation film formed by the polymer substrate and the two metal plating layers on the front side and the back side of the polymer substrate may have an overall thickness of 5 micrometers to 50 micrometers, for example, 20 micrometers. Optionally, the heat insulation film formed by the polymer substrate and the single-sided metal plating layer on the front side (or the back side) of the polymer substrate may have an overall thickness of 5 micrometers to 50 micrometers, for example, 20 micrometers. Optionally, the single metal plating layer of the heat insulation film may have a thickness of 100 angstroms to 800 angstroms, for example, 335 angstroms.

As mentioned above, optionally, the top sheet 102 and the bottom sheet 104 of the inflatable pad 100 may have the same structure. In this case, each of the top sheet 102 and the bottom sheet 104 may comprise an outer layer, an inner layer, and a single-sided metal-plated heat insulation film. Alternately, each of the top sheet 102 and the bottom sheet 104 may comprise an outer layer, an inner layer and a double-sided metal-plated heat insulation film.

Optionally, the top sheet 102 and the bottom sheet 104 of the inflatable pad 100 may have different structures. In this case, one of the top sheet 102 and the bottom sheet 104 may comprise an outer layer, an inner layer, and a single-sided metal-plated or double-sided metal-plated heat insulation film, and the other of the top sheet 102 and the bottom sheet 104 may include only an outer layer and an inner layer. Alternately, the top sheet 102 and the bottom sheet 104 may each comprise an outer layer, an inner layer, and a single-sided metal-plated or double-sided metal-plated heat insulation film. As an example, one of the top sheet 102 and the bottom sheet 104 may comprise a single-sided metal-plated heat insulation film, while the other of the top sheet 102 and the bottom sheet 104 may comprise a double-sided metal-plated heat insulation film. As another example, the top sheet 102 and the bottom sheet 104 may each comprise a single-sided metal-plated heat insulation film, but the metal plating layers of the heat insulation films of the top sheet 102 and the bottom sheet 104 may be plated on different surfaces of the respective polymer substrates.

Referring back to FIG. 3 through FIG. 4C, the inflatable pad 100 further comprises a connecting sheet 114. The connecting sheet 114 is arranged within the inflatable chamber 106 between the top sheet 102 and the bottom sheet 104. The connecting sheet 114 may be made of TPU, PVC, PU or other suitable polymer materials. According to one or more example embodiments, in order to facilitate connection of the top sheet 102 and the bottom sheet 104 to the connecting sheet 114 by means of welding, the connecting sheet 114, the inner layer of the top sheet 102 and the inner layer of the bottom sheet 104 may all be made of a same polymer material, such as one of TPU, PVC, PU, and any other suitable polymer material. Optionally, the connecting sheet 114, the inner layer of the top sheet 102 and the inner layer of the bottom sheet 104 may be made of different polymer materials, such as PVC for the connecting sheet 114, and TPU for the inner layer of the top sheet 102 and the inner layer of the bottom sheet 104.

The connecting sheet 114 comprises a plurality of first welding regions 116 and a plurality of second welding regions 118, wherein the plurality of first welding regions 116 and the plurality of second welding regions 118 are staggered with respect to each other, the plurality of first welding regions 116 are welded to the inner layer of the top sheet 102, and the plurality of second welding regions 118 are welded to the inner layer of the bottom sheet 104. In other words, a plurality of welding positions there the connecting sheet 114 is connected to the top sheet 102 are staggered with respect to a plurality of welding positions where the connecting sheet 114 is connected to the bottom sheet 104. This can aid in preventing the insufficient welding strength which the connecting sheet welded multiple times at the same position may have.

The plurality of first welding regions 116 are evenly distributed on the connecting sheet 114, and the plurality of second welding regions 118 are evenly distributed on the connecting sheet 114, so that the top sheet 102 and the bottom sheet 104 are uniformly welded to the connecting sheet 114 at a plurality of positions, thereby enabling the inflatable pad 100 to remain substantially flat when fully inflated, as shown, for example, in FIG. 2. In an example aspect, the plurality of first welding regions 116 are evenly distributed in an array on the connecting sheet 114, and the top sheet 102 correspondingly comprises a plurality of third welding regions 117 evenly distributed in an array, each first welding region 116 being welded to the corresponding third welding region 117; and the plurality of second welding regions 118 are also evenly distributed in an array on the connecting sheet 114, and the bottom sheet 104 correspondingly comprises a plurality of fourth welding regions 119 evenly distributed in an array, each second welding region 118 being welded to the corresponding fourth welding region 119.

According to an example aspect, the first welding regions 116, the second welding regions 118, the third welding regions 117 and the fourth welding regions 119 have the same shape and are in the form of circular dots. It should be understood that, in some variations, the first welding regions, the second welding regions, the third welding regions, and the fourth welding regions may alternately have other suitable shapes such as a strip, a square, an oval, a triangle, a polygon, and on the like.

The connecting sheet 114 has substantially the same shape as the top sheet 102 and the bottom sheet 104. Optionally, the connecting sheet 114 may have a size slightly smaller than those of the top sheet 102 and the bottom sheet 104, such that after the periphery of the top sheet 102 and the periphery of the bottom sheet 104 are welded to each other and the third welding regions 117 of the top sheet 102 and the fourth welding regions 119 of the bottom sheet 104 are welded to the connecting sheet 114 respectively, there is a gap between the periphery of the connecting sheet 114 and a welding seam of the periphery of the top sheet 102 and the periphery of the bottom sheet 104, in order to enable air passage between the space between the connecting sheet 114 and the top sheet 102 and the space between the connecting sheet 114 and the bottom sheet 104, to enable inflation of the entire inflatable pad 100. Optionally, the connecting sheet 114 may also have a size substantially the same as that of the top sheet 102 and the bottom sheet 104. The periphery of the top sheet 102, the periphery of the connecting sheet 114 and the periphery of the bottom sheet 104 are welded to one another, and one or more communication holes are formed in the connecting sheet 114 such that the air chamber formed between the top sheet 102 and the connecting sheet 114 is in communication with the air chamber formed between the connecting sheet 114 and the bottom sheet 104.

Figure 6:
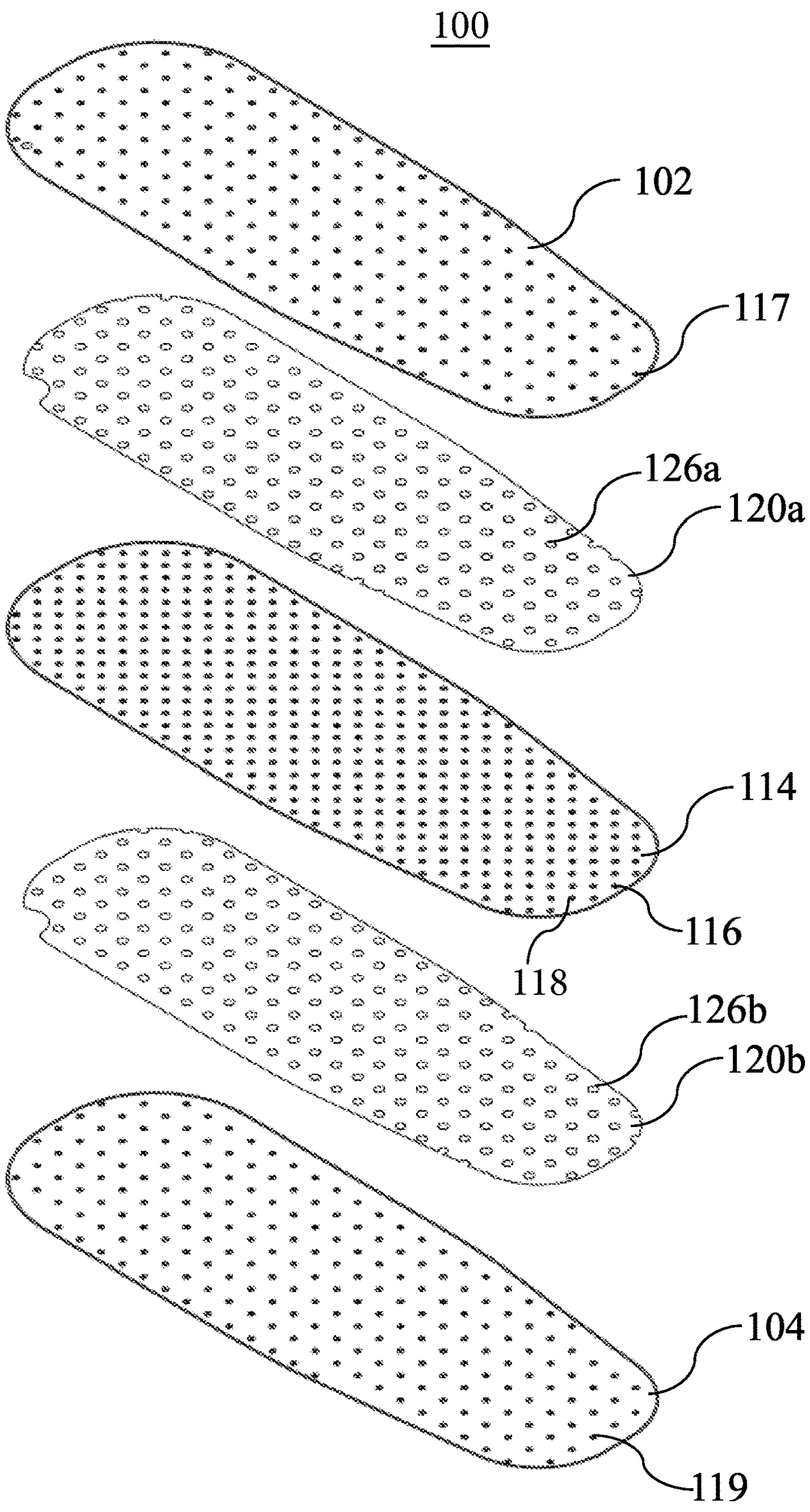
FIG. 6 is a schematic exploded view of an inflatable pad according to a second example embodiment.
Figure 7A:
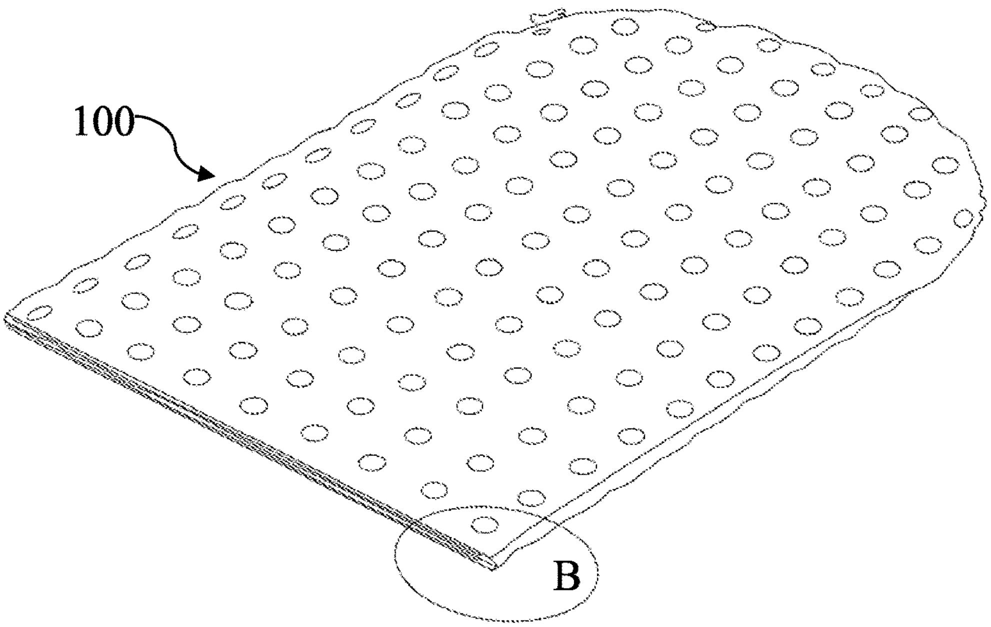
FIG. 7A is a partial schematic diagram of an inflatable pad according to the second example embodiment.
Figure 7B:
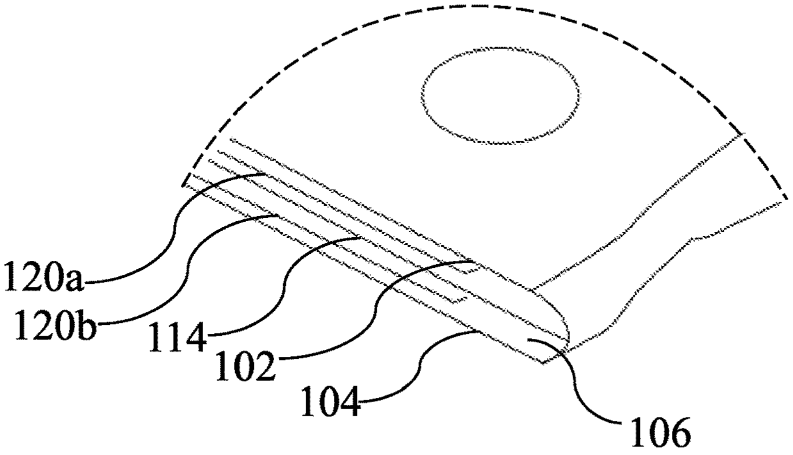
FIG. 7B is a schematic enlarged view of region A of FIG. 7A.
Figure 7C:
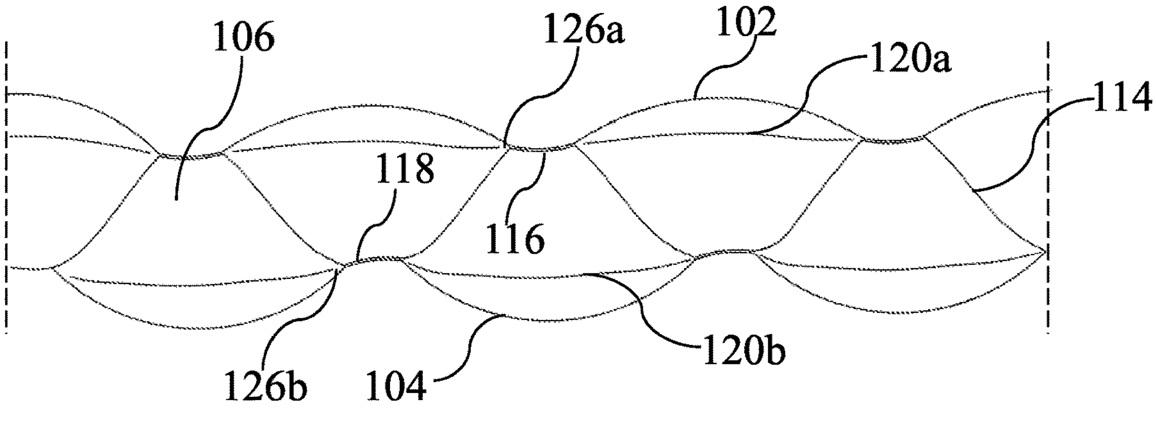
FIG. 7C is a partial sectional view of the inflatable pad of FIG. 7A.
Figure 8:
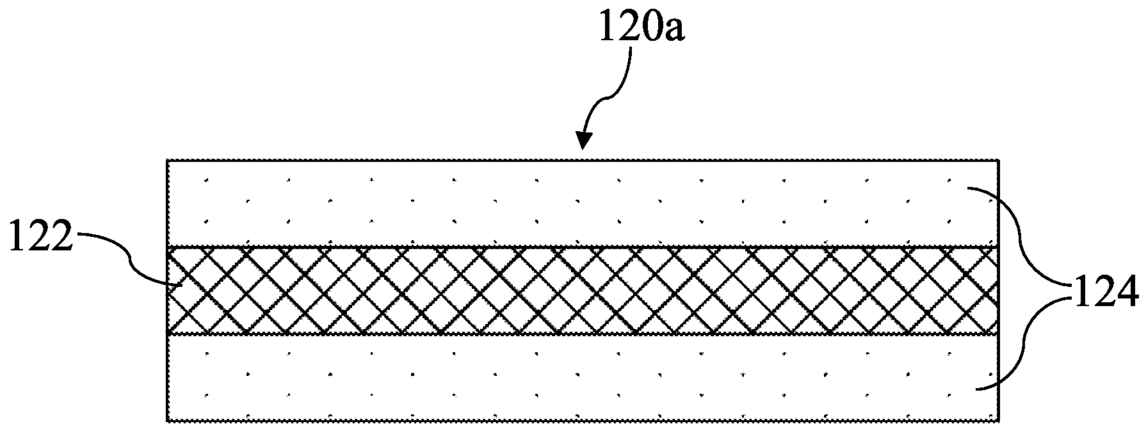
FIG. 8 is a schematic structure diagram of a first heat insulation sheet of an inflatable pad according to the second example embodiment.

FIG. 6 through FIG. 8 show an inflatable pad and components thereof according to a second example embodiment. The inflatable pad according to the second example embodiment is similar to the inflatable pad according to the first embodiment, and the differences therebetween mainly lie in that in the inflatable pad according to the second example embodiment, a heat insulation sheet is further arranged between the top sheet and the connecting sheet and between the connecting sheet and the bottom sheet. The main differences between the two example embodiments will be introduced below.

With reference to FIG. 6 through FIG. 8, the inflatable pad 100 comprises a top sheet 102 and a bottom sheet 104. The periphery of the top sheet 102 is connected to the periphery of the bottom sheet 104, such that the top sheet 102 and the bottom sheet 104 jointly define an inflatable chamber 106 therebetween. The top sheet is configured to a user to sit or lie on, and the bottom sheet 104 is configured to be in contact with the ground. The top sheet and the bottom sheet may have substantially the same shape and size.

At least one of the top sheet 102 and the bottom sheet 104 comprises an outer layer away from the inflatable chamber 106, an inner layer facing the inflatable chamber 106. The outer layer may be a fabric layer to provide a comfortable touch. The outer layer may be a non-flocked fabric layer or a flocked fabric layer. The inner layer may be a polymer material layer, and may be made of TPU, PVC, PU, or other suitable polymer materials.

Optionally, a heat insulation film may be sandwiched between the outer layer and the inner layer of at least one of the top sheet and the bottom sheet. As described with respect to the above example embodiment, the heat insulation film may comprise a polymer substrate and a metal plating layer plated on at least one of a front side and a back side of the polymer substrate. The polymer substrate of the heat insulation film may be made of suitable polymer materials, such as PVC, PP, PET, etc. The metal plating layer of the heat insulation film may be made of suitable metal materials such as aluminum, zinc, copper, silver, or gold. The heat insulation film may be bonded to the outer layer and the inner layer with an adhesive to form a multi-layer composite structure. The metal plating layer of the heat insulation film may have a thickness much smaller than that of its polymer substrate. Optionally, the heat insulation film formed by the polymer substrate and the two metal plating layers on the front side and the back side of the polymer substrate may have an overall thickness of 5 micrometers to 50 micrometers, for example, 20 micrometers. Optionally, the heat insulation film formed by the polymer substrate and the single-sided metal plating layer on the front side (or the back side) of the polymer substrate may also have an overall thickness of 5 micrometers to 50 micrometers, for example, 20 micrometers. Optionally, the single metal plating layer of the heat insulation film may have a thickness of 100 angstroms to 800 angstroms, for example, 335 angstroms.

Optionally, the top sheet 102 and the bottom sheet 104 of the inflatable pad 100 may have the same structure. In this case, each of the top sheet 102 and the bottom sheet 104 may comprise an outer layer, an inner layer and a single-sided metal-plated heat insulation film. Alternatively, each of the top sheet 102 and the bottom sheet 104 may comprise an outer layer, an inner layer and a double-sided metal-plated heat insulation film. Optionally, the top sheet 102 and the bottom sheet 104 of the inflatable pad 100 may also have different structures. In this case, one of the top sheet 102 and the bottom sheet 104 may comprise an outer layer, an inner layer and a single-sided metal-plated or double-sided metal-plated heat insulation film, and the other of the top sheet 102 and the bottom sheet 104 may comprise only an outer layer and an inner layer. Alternately, the top sheet 102 and the bottom sheet 104 may each comprise an outer layer, an inner layer and a single-sided metal-plated or double-sided metal-plated heat insulation film. As an example, one of the top sheet 102 and the bottom sheet 104 may comprise a single-sided metal-plated heat insulation film, while the other of the top sheet 102 and the bottom sheet 104 may comprise a double-sided metal-plated heat insulation film. As another example, the top sheet 102 and the bottom sheet 104 may each comprise a single-sided metal-plated heat insulation film. The metal plating layers of the heat insulation films of the top sheet 102 and the bottom sheet 104 may be plated on the surface, facing the outer layer/inner layer, of the respective polymer substrate.

With continued reference to FIG. 6, FIGS. 7A-7C, and FIG. 8, the inflatable pad 100 may further comprise a connecting sheet 114. The connecting sheet 114 may be arranged within the inflatable chamber 106 between the top sheet 102 and the bottom sheet 104. The connecting sheet 114 may be made of TPU, PVC, PU, or other suitable polymer materials. Optionally, in order to facilitate connecting the top sheet 102 and the bottom sheet 104 to the connecting sheet 114 by means of welding, the connecting sheet 114, the inner layer of the top sheet 102, and the inner layer of the bottom sheet 104 may be made of the same polymer materials, such as one of TPU, PVC, PU, or other suitable polymer materials. Optionally, the connecting sheet 114, the inner layer of the top sheet 102 and the inner layer of the bottom sheet 104 may also be made of different polymer materials, such as PVC for the connecting sheet 114, and TPU for the inner layer of the top sheet 102 and the inner layer of the bottom sheet 104.

According to this example, the connecting sheet 114 comprises a plurality of first welding regions 116 and a plurality of second welding regions 118, wherein the plurality of first welding regions 116 and the plurality of second welding regions 118 are staggered from each other, the plurality of first welding regions 116 are welded to the inner layer of the top sheet 102, and the plurality of second welding regions 118 are welded to the inner layer of the bottom sheet 104. In other words, a plurality of welding positions at which the connecting sheet 114 is welded to the top sheet 102 may be staggered from a plurality of welding positions at which the connecting sheet 114 is welded to the bottom sheet 104. This can aid in preventing insufficient welding strength which the connecting sheet welded multiple times at the same position may result in.

The plurality of first welding regions 116 may be evenly distributed on the connecting sheet 114, and the plurality of second welding regions 118 may be evenly distributed on the connecting sheet 114, so that the top sheet 102 and the bottom sheet 104 are uniformly welded to the connecting sheet 114 at a plurality of positions, thereby the inflatable pad 100 being flat after being fully inflated. In an example aspect of this example embodiment, the plurality of first welding regions 116 may be evenly distributed in an array on the connecting sheet 114, and the top sheet 102 may correspondingly comprise a plurality of third welding regions 117 evenly distributed in an array, each first welding region 116 being welded to the corresponding third welding region 117; and the plurality of second welding regions 118 may also be evenly distributed in an array on the connecting sheet 114, and the bottom sheet 104 may correspondingly comprise a plurality of fourth welding regions 119 evenly distributed in an array, each second welding region 118 being welded to the corresponding fourth welding region 119.

In an aspect of an example embodiment, the first welding regions 116, the second welding regions 118, the third welding regions 117, and the fourth welding regions 119 may have the same shape and may be in the form of circular dots. However, in some variations this example embodiment, the first welding regions, the second welding regions, the third welding regions and the fourth welding regions may alternately have other suitable shapes such as a strip, a square, an oval, a triangle, a polygon, and so on.

In order to further improve a heat insulation performance of the inflatable pad 100, optionally, the inflatable pad 100 may further comprise a first heat insulation sheet 120*a* and a second heat insulation sheet 120*b* (which may also be hereinafter referred to as heat insulation sheets). The first heat insulation sheet 120*a* and the second heat insulation sheet 120*b* may each comprise a polymer substrate and a metal plating layer plated on at least one of a front side and a back side of the polymer substrate. The polymer substrate of the heat insulation sheet may be made of suitable polymer materials, such as PVC, PP, PET, etc. The metal plating layer of the heat insulation sheet may be made of suitable metal materials such as aluminum, zinc, copper, silver, or gold. Further, the polymer substrate of the heat insulation sheet may be made of PET, and the metal plating layer of the heat insulation sheet may be made of aluminum. Optionally, one metal plating layer of the heat insulation sheet may have a thickness of 100 angstroms to 800 angstroms, for example, 335 angstroms. Optionally, the polymer substrate of the heat insulation sheet may have a thickness of 5 micrometers to 50 micrometers, for example, 20 micrometers. Optionally, the heat insulation sheet may have a thickness of 5 micrometers to 50 micrometers, for example, 20 micrometers.

Optionally, the first heat insulation sheet 120*a* and the second heat insulation sheet 120*b* may have the same structure. The structure of the first heat insulation sheet 120*a* and the second heat insulation sheet 120*b* will be explained below using the first heat insulation sheet 120*a* as an example. With reference to FIG. 8, an example structure of the first heat insulation sheet 120*a* will be described. As shown in FIG. 8, in this example embodiment, the first heat insulation sheet 120*a* comprises a polymer substrate 122 and two metal plating layers 124 respectively plated on a front side and a back side of the polymer substrate 122. In other words, the first heat insulation sheet 120*a* is double-sided metal-plated. In some variations of the this example embodiment, the first heat insulation sheet may comprise a polymer substrate and a single metal plating layer plated on the front side or the back side of the polymer substrate, in other words, the first heat insulation sheet may be single-sided metal-plated.

Optionally, the first heat insulation sheet and the second heat insulation sheet may have the same structure, and in this case, both the first heat insulation sheet and the second heat insulation sheet may be double-sided metal-plated. Alternately, both the first heat insulation sheet and the second heat insulation sheet may be single-sided metal-plated. Alternately, the first heat insulation sheet and the second heat insulation sheet may have different structures. For example, one of the first heat insulation sheet and the second heat insulation sheet may be double-sided metal-plated, and the other of the first heat insulation sheet and the second heat insulation sheet may be single-sided metal-plated. As another example, both the first heat insulation sheet and the second heat insulation sheet may both be single-sided metal-plated, but metal plating layers of the first heat insulation sheet and the second heat insulation sheet may be plated on the surface, facing the outer layer/inner layer of the respective polymer substrate.

The first heat insulation sheet 120*a* is arranged within the inflatable chamber 106 between the top sheet 102 and the connecting sheet 114, and the second heat insulation sheet 120*b* is arranged within the inflatable chamber 106 between the connecting sheet 114 and the bottom sheet 104. The first heat insulation sheet 120*a* and the second heat insulation sheet 120*b* may have substantially the same shape and size as that of the connecting sheet 114. In an illustrated embodiment, one first heat insulation sheet 120*a* is arranged between the top sheet 102 and the connecting sheet 114, and one second heat insulation sheet 120*b* is arranged between the connecting sheet 114 and the bottom sheet 104. It should be understood that, in some variations, two or more first heat insulation sheets 120*a* may be arranged between the top sheet 102 and the connecting sheet 114, and two or more second heat insulation sheets 120*b* may also be arranged between the connecting sheet 114 and the bottom sheet 104.

In order to facilitate the welding between the top sheet 102 and the connecting sheet 114, the first heat insulation sheet 120*a* comprises a plurality of first openings 126*a*, each first opening 126*a* being configured to allow a corresponding first welding region 116 of the connecting sheet 114 to be in contact with and welded to the top sheet 102. In order to facilitate the welding between the connecting sheet 114 and the bottom sheet 104, the second heat insulation sheet 120*b* comprises a plurality of second openings 126*b*, each second opening 126*b* being configured to allow a corresponding second welding region 118 of the connecting sheet 114 to be in contact with and welded to the bottom sheet 104. In this way, a plurality of first welding regions 116 of the connecting sheet 114 may be in contact with and welded to the top sheet 102 through the plurality of first openings 126*a,* and a plurality of second welding regions 118 of the connecting sheet 114 may be in contact with and welded to the bottom sheet 104 through the plurality of second openings 126*b*.

During mass production of the inflatable pad 100, a plurality of first heat insulation sheets 120*a* can be stacked together and laser-cut to form the plurality of first openings 126*a,* and a plurality of second heat insulation sheets 120*b* can be stacked together and laser-cut to form the plurality of second openings 126*b*. If the polymer substrate of each of the first heat insulation sheet 120*a* and the second heat insulation sheet 120*b* is double-sided metal-plated (in other words, neither side of the polymer substrate is exposed outside), in the process of perforating through laser cutting, it is less likely for edges of the first openings 126*a* of the first heat insulation sheets 120*a* and edges of the second openings 126*b* of the second heat insulation sheets 120*b* to become stuck together. Subsequently, it is easy to separate the plurality of first heat insulation sheets 120*a* and the plurality of second heat insulation sheets 120*b,* thereby avoiding tearing or damaging of the first openings 126*a* and the second openings 126*b* during separation, and improving the production efficiency and yield of the inflatable pad.

In order to evaluate the heat insulation performance of an example inflatable pad, a thermal resistance value (R-value) of an inflatable pad according to an example embodiment and a thermal resistance value of a comparative inflatable pad were determined in accordance with the ASTM F3340-18 standard. The inflatable pad according to the example embodiment comprises a top sheet, a bottom sheet, a connecting sheet and two heat insulation sheets (i.e., a first heat insulation sheet and a second heat insulation sheet), the top sheet and the bottom sheet each comprise an outer layer and an inner layer, and each heat insulation sheet comprises a PET substrate and aluminum-plated layers plated on a front side and a back side of the PET substrate. The comparative inflatable pad has a structure similar to that of the inflatable pad of the example embodiment, and the difference therebetween mainly lies in that the comparative inflatable pad uses two PET single-sided aluminum-plated films to replace two heat insulation sheets. The test results indicate that the R-value of the inflatable pad according to the example embodiment is about 7.3 $ft^{2}\cdot{}^{\circ}$ F·h/Btu, while the R-value of the comparative inflatable pad is about 4.7 $ft^{2}\cdot{}^{\circ}$ F·h/Btu. Therefore, it can be seen that compared with a single-sided aluminum-plated film, a double-sided aluminum-plated heat insulation sheet can improve the thermal resistance value of the inflatable pad, resulting in a better heat insulation effect of the inflatable pad.

From another perspective, in order to enable the inflatable pad to have the same heat insulation effect, compared with the single-sided aluminum-plated film, a smaller number of double-sided aluminum-plated heat insulation sheets can be used. For example, assuming that a certain thermal resistance value/heat insulation effect is desired, 2 to 3 layers of single-sided aluminum-plated films would be arranged in the inflatable pad. However, if a double-sided aluminum-plated heat insulation sheet is provided, only 1 to 2 layers would be needed to achieve a similar thermal resistance value/heat insulation effect. This can reduce the production cost of the inflatable pad and make it more lightweight.

Moreover, for an inflatable pad with an aluminum-plated film, when the user turns over from side to side while sleeping on the inflatable pad, the aluminum-plated film may be subjected to stress, bending, and friction with the surroundings, resulting in noise. If a large number of aluminum-plated films are used, the movement or turning of the user may generate significant noise, which may affect rest. For an inflatable pad according to an example embodiment, since a smaller number of heat insulation sheets can be used to achieve the same heat insulation effect, the noise generated when the user moves or turns can also be reduced, thereby improving the user's resting comfort.

Thus, the inflatable pad comprising the heat insulation sheet according to an example embodiment may facilitates mass production, may have a good heat insulation performance, and may also reduce the noise created when a user turns over, thereby improving comfort during use.

Figure 9:
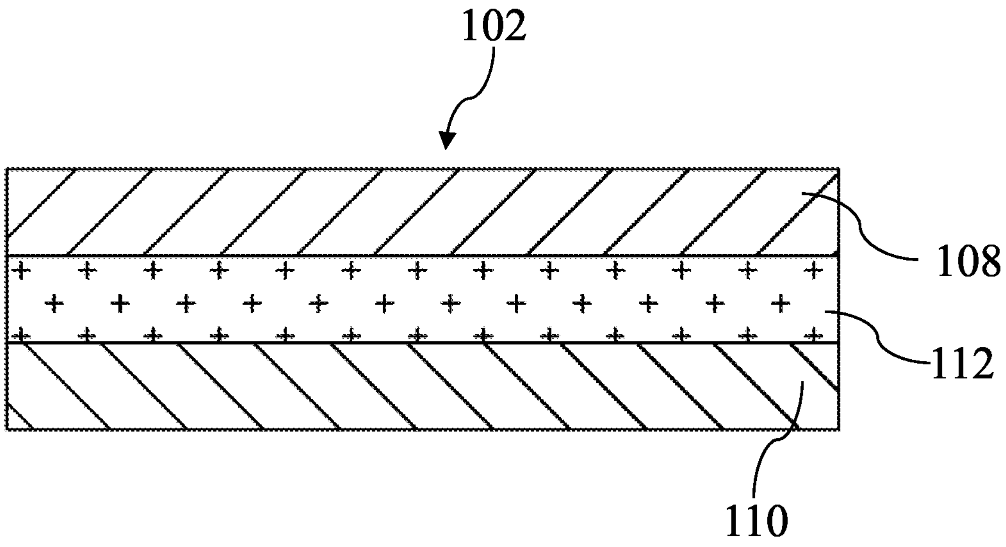
FIG. 9 is a schematic structure diagram of a top sheet of an inflatable pad according to an example embodiment.

In some variations of the above-described example embodiment, with reference to FIG. 9, one or both of the top sheet 102 and the bottom sheet 104 may have a multi-layer composite structure comprising a heat insulation film. The top sheet 102 and the bottom sheet 104 may have the same multi-layer composite structure. For the sake of simplicity, the top sheet 102 will be used as an example to explain the structure of both the top sheet 102 and the bottom sheet 104. As shown in FIG. 9, the top sheet 102 may comprise an outer layer 108 away from the inflatable chamber 106, an inner layer 110 facing the inflatable chamber 106, and a heat insulation film 112 sandwiched between the outer layer 108 and the inner layer 110. The outer layer 108 may be a fabric layer to provide a comfortable touch. The outer layer 108 may be a non-flocked fabric layer or a flocked fabric layer. The inner layer 110 may be a polymer material layer, and can be made of TPU, PVC, PU, or other suitable polymer materials. The heat insulation film 112 may comprise a polymer substrate and a metal plating layer plated on at least one of a front side and a back side of the polymer substrate. In other words, the heat insulation film 112 may be single-sided metal-plated or double-sided metal-plated. If the heat insulation film is a polymer substrate with single-sided metal plating, the metal plating layer may be chosen to face either the outer layer or the inner layer. The polymer substrate of the heat insulation film 112 may be made of suitable polymer materials, such as PVC, PP, PET, etc. The metal plating layer of the heat insulation film 112 may be made of suitable metal materials such as aluminum, zinc, copper, silver, or gold. Further optionally, the polymer substrate of the heat insulation film 112 may be made of PET, and the metal plating layer of the heat insulation film 112 may be made of aluminum. In some example implementations, the single metal plating layer of the heat insulation film may have a thickness of 100 angstroms to 800 angstroms, for example, 335 angstroms. In some example implementations, the polymer substrate of the heat insulation film may have a thickness of 5 micrometers to 50 micrometers, for example, 20 micrometers. In some example implementations, the heat insulation film may have a thickness of 5 micrometers to 50 micrometers, for example, 20 micrometers. The heat insulation film 112 may be bonded to the outer layer 108 and the inner layer 110 with an adhesive to form a multi-layer composite structure. The top sheet 102 comprising the heat insulation film and the bottom sheet 104 comprising the heat insulation film may aid in improving the heat insulation performance of the inflatable pad 100.

It should be understood that, in some example aspects of this example embodiment, the top sheet and the bottom sheet of the inflatable pad may also have different structures. For example, the top sheet may have an outer layer, an inner layer and a heat insulation film, while the bottom sheet only may have only an outer layer and an inner layer. Alternately, the bottom sheet may have an outer layer, an inner layer and a heat insulation film, while the top sheet may have only an outer layer and an inner layer.

Figure 10A:
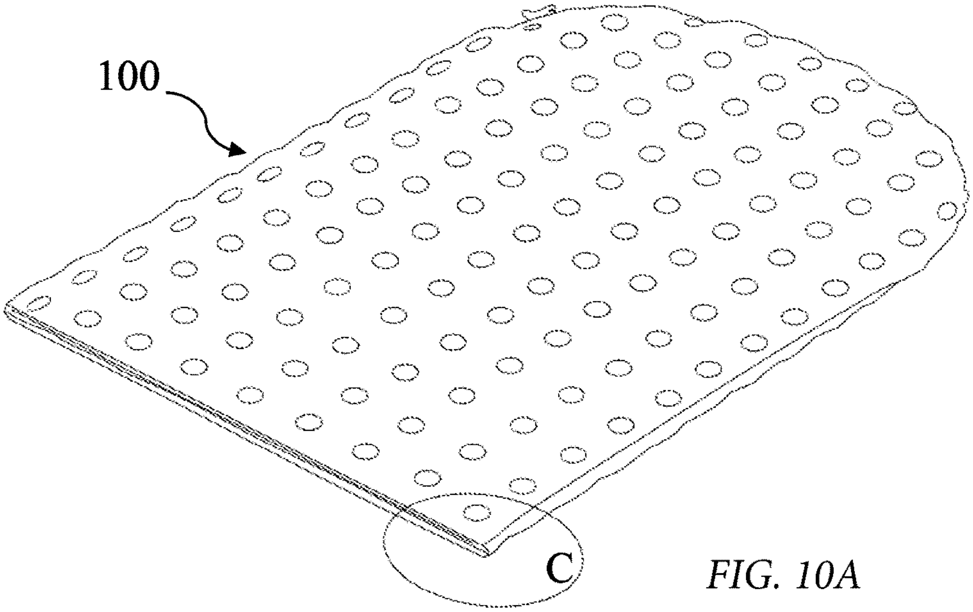
FIG. 10A is a partial schematic diagram of an inflatable pad according to a third example embodiment.
Figure 10B:
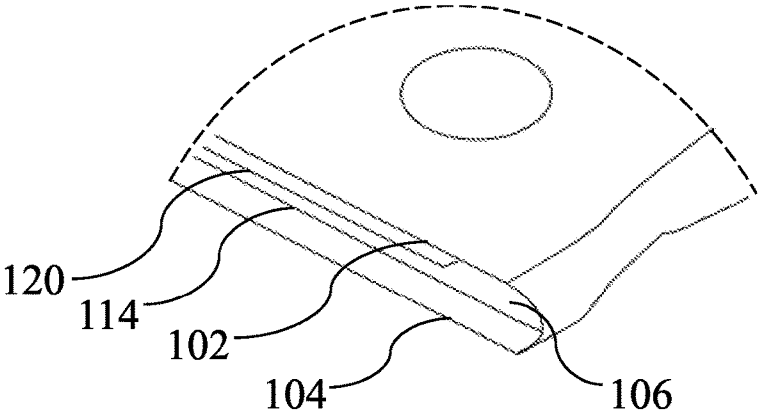
FIG. 10B is a schematic enlarged view of region B of FIG. 10A.
Figure 10C:
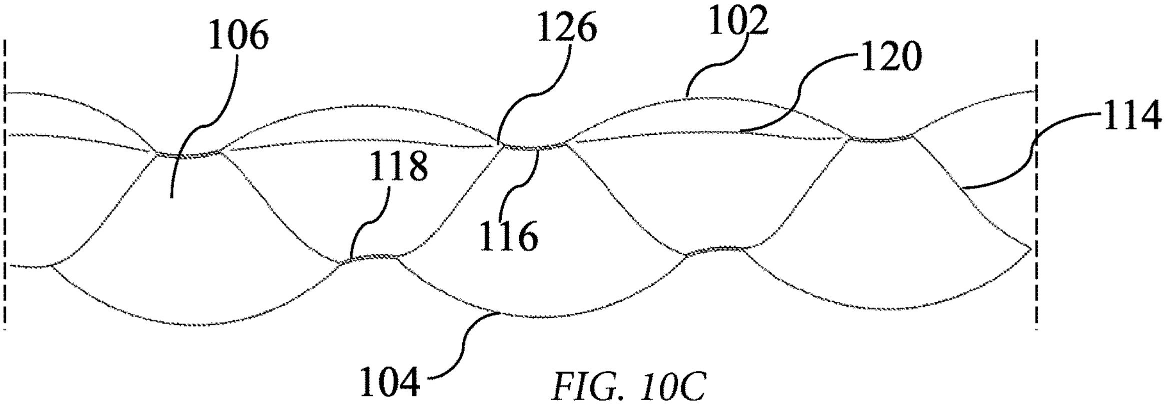
FIG. 10C is a partial sectional view of the inflatable pad of FIG. 10A.

FIG. 10A to FIG. 10C show an inflatable pad 100 and components thereof according to a third example embodiment. The inflatable pad according to the third example embodiment is similar to the inflatable pad according to the second example embodiment, and the differences therebetween merely lie in that the inflatable pad 100 according to the third example embodiment only arranges one or more heat insulation sheets 120 between the top sheet 102 and the connecting sheet 114. The differences between the second and third example embodiments will be introduced below.

With reference to FIG. 10A to FIG. 10C, the inflatable pad 100 according to the third example embodiment comprises a top sheet 102 and a bottom sheet 104. The periphery of the top sheet 102 is connected to the periphery of the bottom sheet 104, such that the top sheet 102 and the bottom sheet 104 jointly define an inflatable chamber 106 therebetween. Optionally, the top sheet 102 and the bottom sheet 104 may have the same shape and size. AT least one of the top sheet 102 and the bottom sheet 104 may each comprise an outer layer facing away from the inflatable chamber 106 and an inner layer facing the inflatable chamber 106. The outer layer may be a fabric layer to provide a comfortable touch. The outer layer may be a non-flocked fabric layer or a flocked fabric layer. The inner layer may be a polymer material layer, and can be made of TPU, PVC, PU or other suitable polymer materials.

Optionally a heat insulation film may be sandwiched between the outer layer and the inner layer, wherein the heat insulation film may comprise a polymer substrate and a metal plating layer plated on at least one of a front side and a back side of the polymer substrate. The outer layer may be a fabric layer to provide a comfortable touch. The outer layer may be a non-flocked fabric layer or a flocked fabric layer. The inner layer may be a polymer material layer, and can be made of TPU, PVC, PU, or other suitable polymer materials. The polymer substrate of the heat insulation film may be made of suitable polymer materials, such as PVC, PP, PET, etc. The metal plating layer of the heat insulation film may be made of suitable metal materials such as aluminum, zinc, copper, silver, or gold. The heat insulation film may be bonded to the outer layer and the inner layer with an adhesive to form a multi-layer composite structure.

Optionally, the top sheet 102 and the bottom sheet 104 of the inflatable pad 100 may have the same structure. In this case, each of the top sheet 102 and the bottom sheet 104 may comprise an outer layer, an inner layer and a single-sided metal-plated heat insulation film. Alternately, each of the top sheet 102 and the bottom sheet 104 may comprise an outer layer, an inner layer, and a double-sided metal-plated heat insulation film. Optionally, the top sheet 102 and the bottom sheet 104 of the inflatable pad 100 may also have different structures. In this case, one of the top sheet 102 and the bottom sheet 104 may comprise an outer layer, an inner layer and a single-sided metal-plated or double-sided metal-plated heat insulation film, and the other of the top sheet 102 and the bottom sheet 104 may comprise only an outer layer and an inner layer. Alternately, the top sheet 102 and the bottom sheet 104 may each comprise an outer layer, an inner layer and a single-sided metal-plated or double-sided metal-plated heat insulation film. As an example, one of the top sheet 102 and the bottom sheet 104 may comprise a single-sided metal-plated heat insulation film, while the other of the top sheet 102 and the bottom sheet 104 may comprise a double-sided metal-plated heat insulation film. As another example, the top sheet 102 and the bottom sheet 104 may each comprise a single-sided metal-plated heat insulation film, but the metal plating layers of the heat insulation films of the top sheet 102 and the bottom sheet 104 may be plated on different surfaces of the polymer substrate.

The inflatable pad 100, according to the third example embodiment further comprises a connecting sheet 114. The connecting sheet 114 is arranged within the inflatable chamber 106 between the top sheet 102 and the bottom sheet 104. The connecting sheet 114 comprises a plurality of first welding regions 116 and a plurality of second welding regions 118, wherein the plurality of first welding regions 116 and the plurality of second welding regions 118 are staggered with respect to each other, the plurality of first welding regions 116 are welded to the inner layer of the top sheet 102, and the plurality of second welding regions 118 are welded to the inner layer of the bottom sheet 104.

The inflatable pad 100, according to this third example embodiment, further comprises a heat insulation sheet 120. The heat insulation sheet 120 comprises a polymer substrate and metal plating layers plated on at least one of a front side and a back side of the polymer substrate. The heat insulation sheet 120 is arranged, within the inflatable chamber 106, between the top sheet 102 and the connecting sheet 114. In the illustrated example embodiment, the single heat insulation sheet 120 is arranged between the top sheet 102 and the connecting sheet 114. It should be understood that, alternately, two or more heat insulation sheets may also be arranged between the top sheet and the connecting sheet.

In order to facilitate the welding between the top sheet 102 and the connecting sheet 114, the heat insulation sheet 120 comprises a plurality of openings 126, each opening 126 being configured to allow a corresponding first welding region 116 of the connecting sheet 114 to be in contact with and welded to the top sheet 102. In this way, a plurality of first welding regions 116 of the connecting sheet 114 may be in contact with and welded to the top sheet 102 through the plurality of openings 126, and a plurality of second welding regions 118 of the connecting sheet 114 may be in direct contact with and welded to the bottom sheet 104.

In some variations of the third example embodiment, the inflatable pad may alternately include only one or more heat insulation sheets between the bottom sheet and the connecting sheet, and the heat insulation sheet comprises a plurality of openings, each opening being configured to allow a corresponding second welding region of the connecting sheet to be in contact with and welded to the bottom sheet. In this way, the plurality of first welding regions of the connecting sheet may be in direct contact with and welded to the top sheet, and the plurality of second welding regions of the connecting sheet may be in contact with and welded to the bottom sheet through the plurality of openings.

In some variations of the third example embodiment, the top sheet and the bottom sheet of the inflatable pad may have the same multi-layer composite structure. Each of the top sheet and the bottom sheet may comprise an outer layer facing away from the inflatable chamber, an inner layer facing the inflatable chamber, and a heat insulation film sandwiched between the outer layer and the inner layer. The heat insulation film comprises a polymer substrate and a metal plating layer plated on at least one of a front side and a back side of the polymer substrate. If the heat insulation film is a polymer substrate with single-sided metal plating, the metal plating layer can be chosen to face either the outer layer or the inner layer. The top sheet comprising the heat insulation film and the bottom sheet comprising the heat insulation film can improve the heat insulation performance of the inflatable pad. It should be understood that, in some other variations, the top sheet and the bottom sheet of the inflatable pad may have different structures. For example, the top sheet may have an outer layer, an inner layer and a heat insulation film, while the bottom sheet may have only an outer layer and an inner layer; alternatively, the bottom sheet may have an outer layer, an inner layer and a heat insulation film, while the top sheet may have only an outer layer and an inner layer.

Figure 11A:
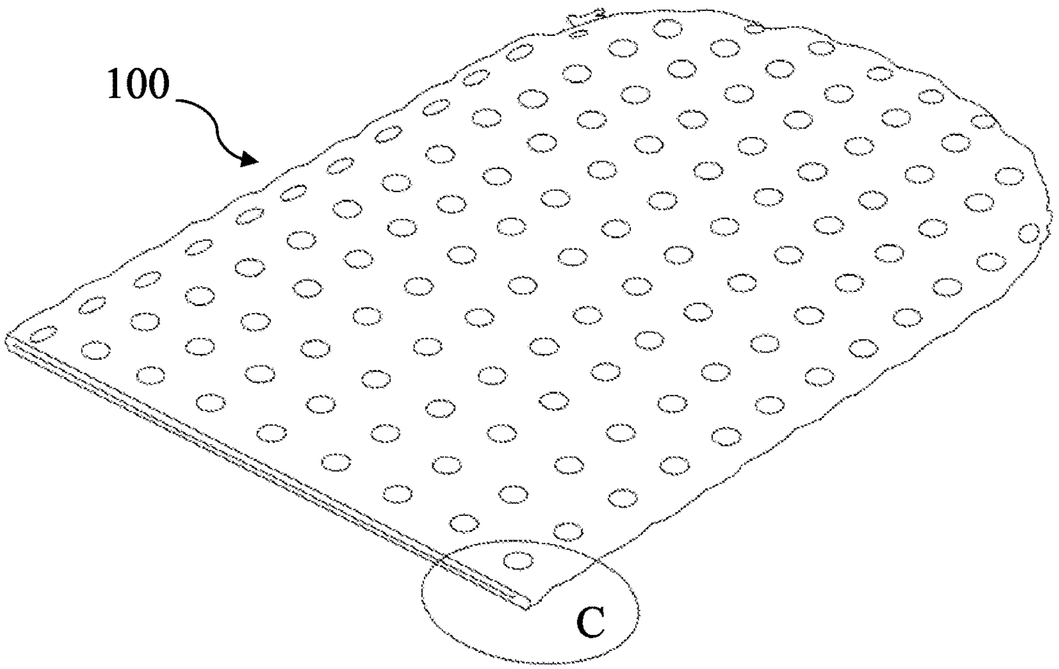
FIG. 11A is a partial schematic diagram of an inflatable pad according to a fourth example embodiment.
Figure 11B:
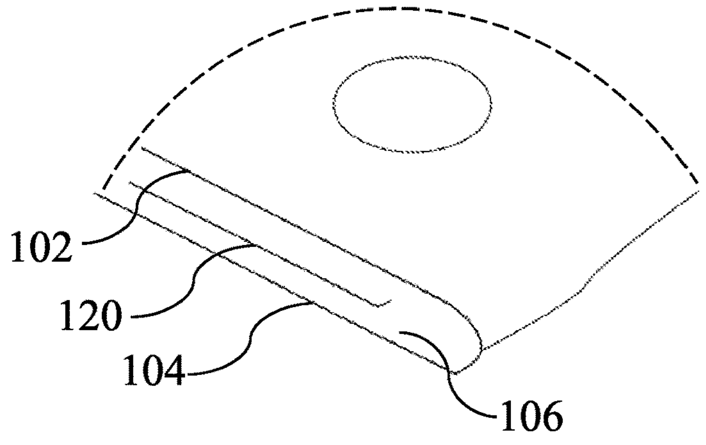
FIG. 11B is a schematic enlarged view of region C of FIG. 11A.
Figure 11C:
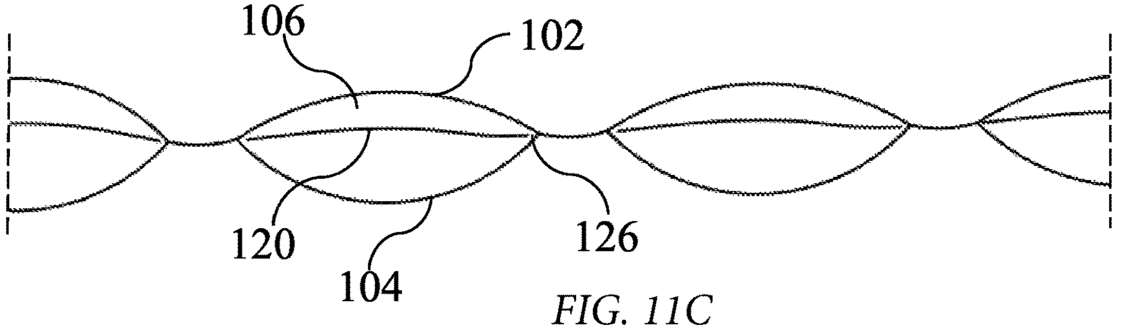
FIG. 11C is a partial sectional view of the inflatable pad of FIG. 11A.

FIG. 11A to FIG. 11C show an inflatable pad 100 and components thereof according to a fourth example embodiment. The inflatable pad according to the fourth example embodiment is similar to the inflatable pad according to the second and third example embodiments, and the main differences therebetween lie in that the inflatable pad according to the fourth example embodiment is not provided with a connecting sheet. The differences among the example embodiments will be introduced below.

With reference to FIG. 11A through FIG. 11C, the inflatable pad 100 according to the fourth example embodiment comprises a top sheet 102 and a bottom sheet 104. The periphery of the top sheet 102 is connected to the periphery of the bottom sheet 104, such that the top sheet 102 and the bottom sheet 104 jointly define an inflatable chamber 106 therebetween. One or both of top sheet 102 and the bottom sheet 104 may comprise an outer layer facing away from the inflatable chamber 106 and an inner layer facing the inflatable chamber 106. The outer layer may be a fabric layer to provide a comfortable touch. The outer layer may be a non-flocked fabric layer or a flocked fabric layer. The inner layer is a polymer material layer, and can be made of TPU, PVC, PU, or other suitable polymer materials.

As shown, the inflatable pad 100 further comprises a heat insulation sheet 120. Optionally, the heat insulation sheet 120 comprises a polymer substrate and metal plating layers plated on a front side and a back side of the polymer substrate. The heat insulation sheet 120 is arranged within the inflatable chamber 106 between the top sheet 102 and the bottom sheet 104. As shown, one heat insulation sheet 120 is arranged between the top sheet 102 and the bottom sheet 104. It should be understood that, in some variations of the fourth example embodiment, two or more heat insulation sheets may be arranged between the top sheet and the bottom sheet. In some example variations, the heat insulation sheet 120 comprises a polymer substrate and a metal plating layer on one of the front side and the back side of the polymer substrate.

In order to facilitate the welding between the top sheet 102 and the bottom sheet 104, the heat insulation sheet 120 comprises a plurality of openings 126, such that the top sheet 102 can be in contact with and welded to the bottom sheet 104 via the plurality of openings 126.

Optionally, one or both of the top sheet 102 and the bottom sheet 104 further comprises a heat insulation film sandwiched between the outer layer and the inner layer. The structure and materials of the heat insulation film may be the same as in the above-described example embodiments. According to an example variation, the top sheet and the bottom sheet of the inflatable pad may have the same multi-layer composite structure. Each of the top sheet and the bottom sheet may comprise an outer layer facing away from the inflatable chamber, an inner layer facing the inflatable chamber, and a heat insulation film sandwiched between the outer layer and the inner layer. The heat insulation film comprises a polymer substrate and a metal plating layer plated on at least one of a front side and a back side of the polymer substrate. If the heat insulation film is a polymer substrate with single-sided metal plating, the metal plating layer can be chosen to face either the outer layer or the inner layer. The top sheet comprising the heat insulation film and the bottom sheet comprising the heat insulation film can improve the heat insulation performance of the inflatable pad. It should be understood that, in some other example variations, the top sheet and the bottom sheet of the inflatable pad may have different structures. For example, the top sheet may have an outer layer, an inner layer and a heat insulation film, while the bottom sheet may have only an outer layer and an inner layer. Alternately, the bottom sheet may have an outer layer, an inner layer and a heat insulation film, while the top sheet may have only an outer layer and an inner layer.

Figure 12A:
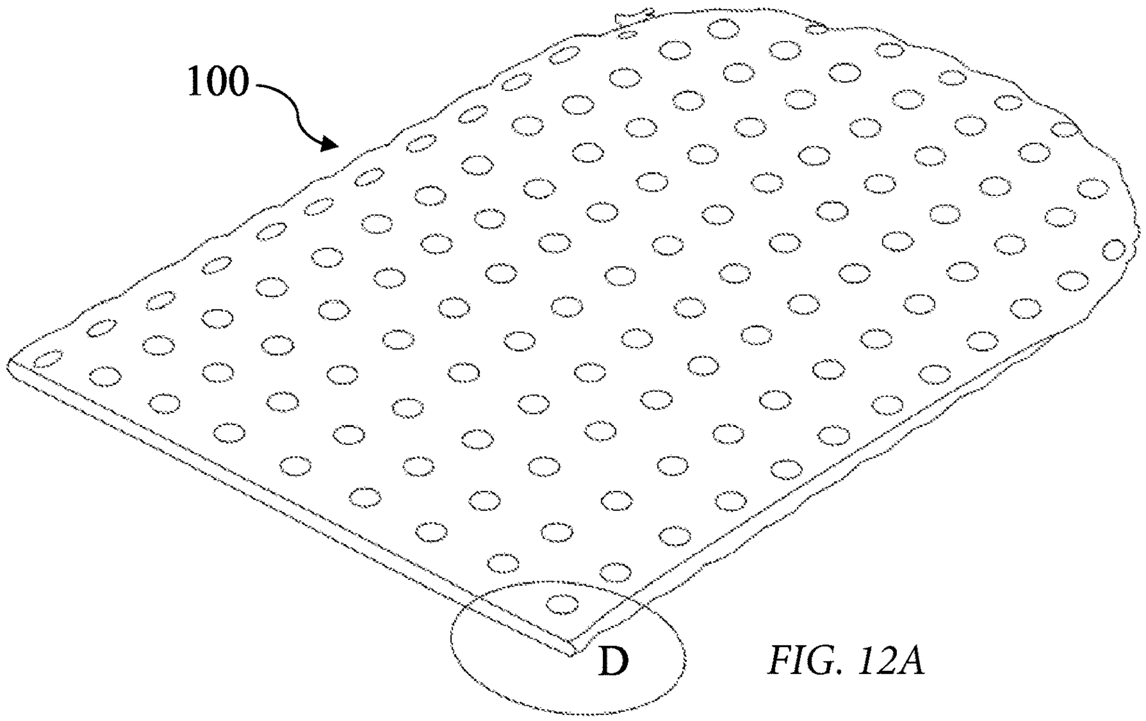
FIG. 12A is a partial schematic diagram of an inflatable pad according to a fifth example embodiment.
Figure 12B:
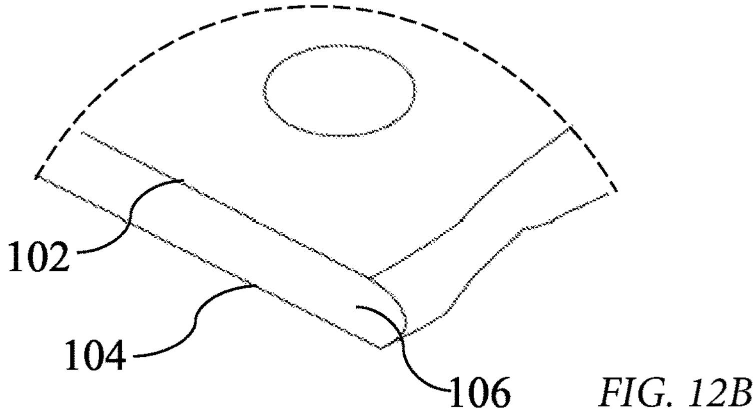
FIG. 12B is a schematic enlarged view of region D in FIG. 12A.
Figure 12C:
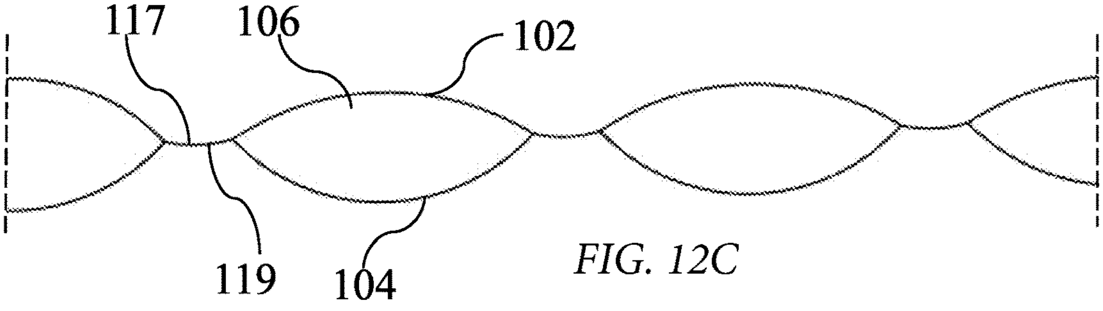
FIG. 12C is a partial sectional view of the inflatable pad in FIG. 12A.

FIG. 12A to FIG. 12C show an inflatable pad and components thereof according to a fifth example embodiment. The inflatable pad according to the fifth embodiment is similar to the inflatable pad according to the first example embodiment, and the differences therebetween lie in that the inflatable pad according to the fifth example embodiment is not provided with a connecting sheet. The main differences among the embodiments will be introduced below.

With reference to FIG. 12A to FIG. 12C, the inflatable pad 100 according to the fifth example embodiment comprises a top sheet 102 and a bottom sheet 104, the top sheet 102 and the bottom sheet 104 being connected to each other and jointly defining an inflatable chamber 106 therebetween. At least one of the top sheet 102 and the bottom sheet 104 comprises an outer layer facing away from the inflatable chamber 106, an inner layer facing the inflatable chamber 106, and a heat insulation film sandwiched between the outer layer and the inner layer, wherein the heat insulation film comprises a polymer substrate and a metal plating layer plated on at least one of a front side and a back side of the polymer substrate. The outer layer is a fabric layer to provide a comfortable touch (the outer layer may also be referred to as a comfort layer). The outer layer may be a non-flocked fabric layer or a flocked fabric layer. The inner layer is a polymer material layer, and can be made of TPU, PVC, PU, or other suitable polymer materials. The polymer substrate of the heat insulation film may be made of suitable polymer materials, such as PVC, PP, PET, etc. The metal plating layer of the heat insulation film may be made of suitable metal materials such as aluminum, zinc, copper, silver, or gold. The heat insulation film may be bonded to the outer layer and the inner layer with an adhesive to form a multi-layer composite structure.

Optionally, the top sheet 102 and the bottom sheet 104 of the inflatable pad 100 may have the same structure. In this case, each of the top sheet 102 and the bottom sheet 104 comprises an outer layer, an inner layer and a single-sided metal-plated or double-sided metal-plated heat insulation film. Optionally, the top sheet 102 and the bottom sheet 104 of the inflatable pad 100 may also have different structures. In this case, one of the top sheet 102 and the bottom sheet 104 may comprise an outer layer, an inner layer and a single-sided metal-plated or double-sided metal-plated heat insulation film, and the other of the top sheet 102 and the bottom sheet 104 may only comprise an outer layer and an inner layer. Alternately, the top sheet 102 and the bottom sheet 104 may each comprise an outer layer, an inner layer and a single-sided metal-plated or double-sided metal-plated heat insulation film. As an example, one of the top sheet 102 and the bottom sheet 104 may comprise a single-sided metal-plated heat insulation film, while the other of the top sheet 102 and the bottom sheet 104 may comprise a double-sided metal-plated heat insulation film. As another example, the top sheet 102 and the bottom sheet 104 may each comprise a single-sided metal-plated heat insulation film, but the metal plating layers of the heat insulation films of the top sheet 102 and the bottom sheet 104 may be plated on different surfaces of the polymer substrate.

With reference to FIG. 12C, the top sheet 102 comprises a plurality of third welding regions 117, and the bottom sheet 104 comprises a plurality of fourth welding regions 119, wherein each third welding region 117 is directly welded to the corresponding fourth welding region 119, so that the top sheet 102 and the bottom sheet 104 are welded to each other at a plurality of positions. The plurality of third welding regions 117 may be evenly distributed on the top sheet 102, and the plurality of fourth welding regions 119 may be evenly distributed on the bottom sheet 104, to help enable the inflatable pad 100 to maintain its flatness when fully inflated. As illustrated, the plurality of third welding regions 117 may be evenly distributed on the top sheet 102 in an array, and the plurality of fourth welding regions 119 may be evenly distributed on the bottom sheet 104 in an array.

Figure 13:
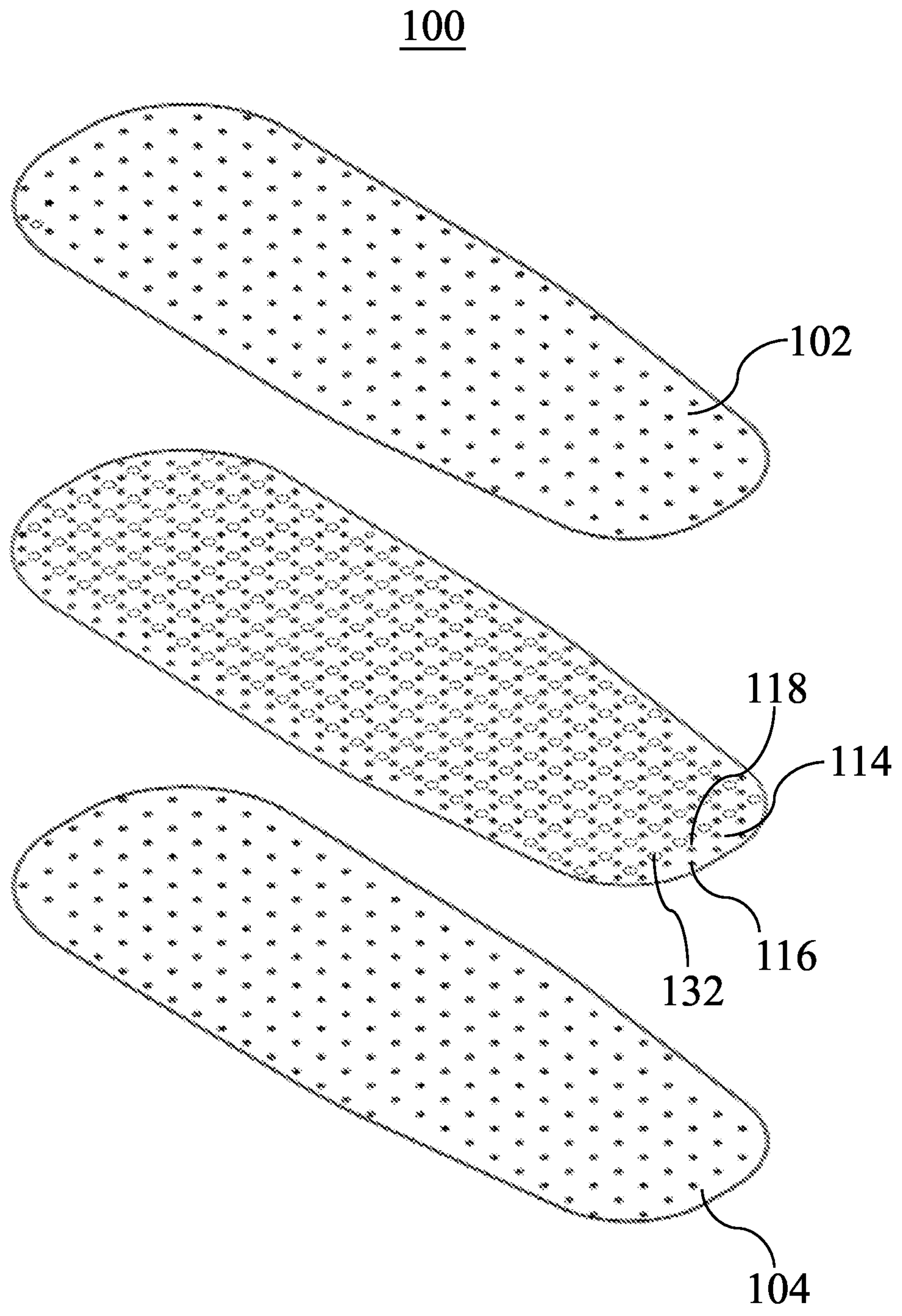
FIG. 13 is a schematic exploded view of an inflatable pad according to a sixth example embodiment.

FIG. 13 shows an exploded view of an inflatable pad 100 according to a sixth example embodiment of the present utility model. The inflatable pad according to the sixth embodiment is similar to the inflatable pad according to the first embodiment, and the differences therebetween merely lie in that the connecting sheet 114 of the inflatable pad 100 according to the sixth embodiment is further provided with a plurality of lightening holes 132. The plurality of lightening holes 132 of the connecting sheet 114 are staggered from the plurality of first welding regions 116 and the plurality of second welding regions 118 of the connecting sheet 114, to avoid affecting the welding between the connecting sheet 114 and the top sheet 102 and the bottom sheet 104. By means of arranging the lightening holes 132, the weight of the connecting sheet 114 can be reduced, thereby making the inflatable pad 100 more lightweight. In an illustrated embodiment, the plurality of lightening holes 132 are evenly distributed on the connecting sheet 114 in an array. It should be understood that, the plurality of lightening holes 132 according to the sixth embodiment may be arranged in the connecting sheet of other embodiments in the same way.

Figure 14:
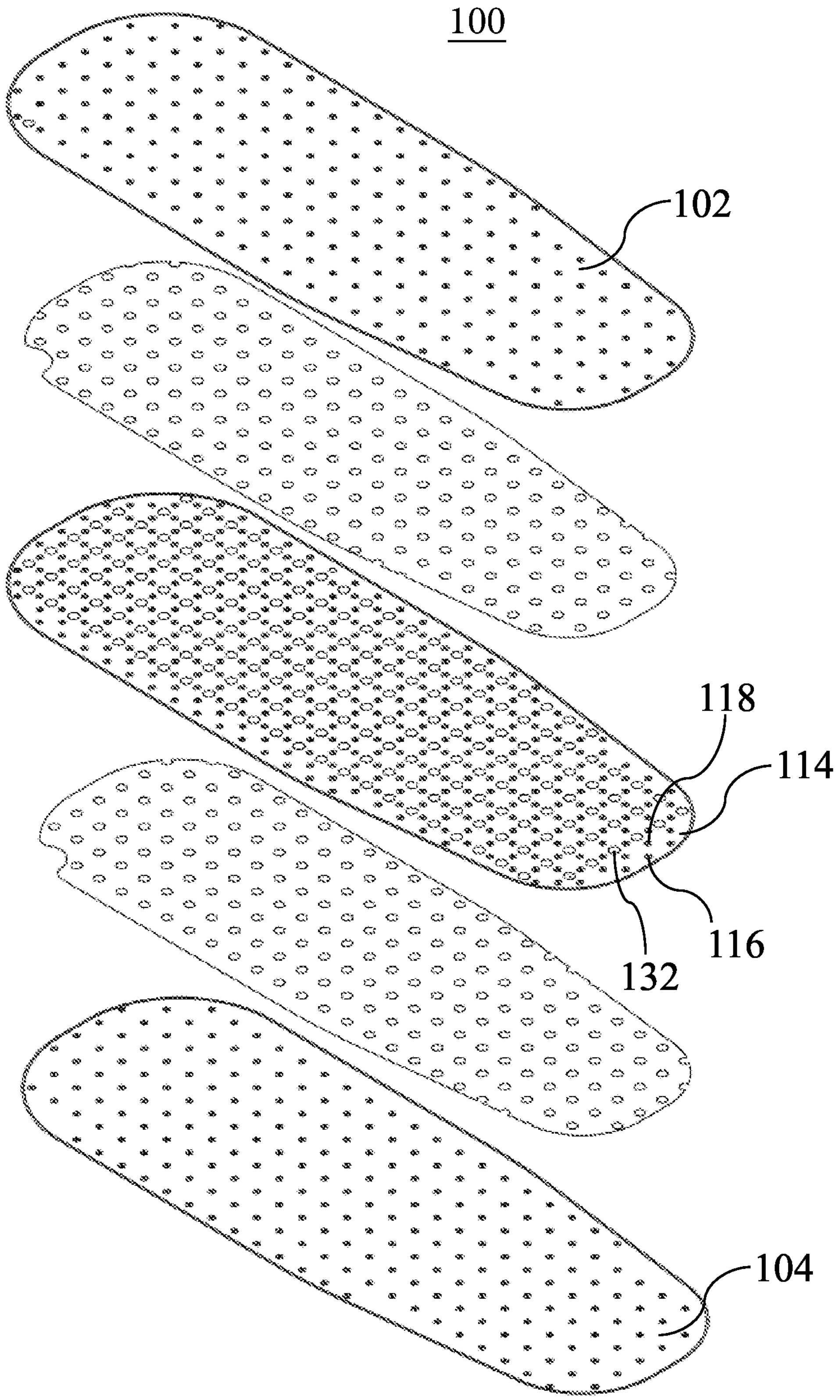
FIG. 14 is a schematic exploded view of an inflatable pad according to a seventh example embodiment.

FIG. 14 shows an exploded view of an inflatable pad 100 according to a seventh example embodiment. The inflatable pad according to the seventh example embodiment is similar to the inflatable pad according to the second example embodiment, and the differences there among lie in that the connecting sheet 114 of the inflatable pad 100 according to the seventh example embodiment is further provided with a plurality of lightening holes 132. The plurality of lightening holes 132 of the connecting sheet 114 are staggered with respect to the plurality of first welding regions 116 and the plurality of second welding regions 118 of the connecting sheet 114, to avoid affecting the welding between the connecting sheet 114 and the top sheet 102 and the bottom sheet 104. By means of the presence of the lightening holes 132, the weight of the connecting sheet 114 can be reduced, thereby making the inflatable pad 100 more lightweight. As shown, the plurality of lightening holes 132 may be evenly distributed on the connecting sheet 114 in an array. It should be understood that, the plurality of lightening holes 132 may be arranged in the connecting sheet of other example embodiments in the same way.

Figure 15:
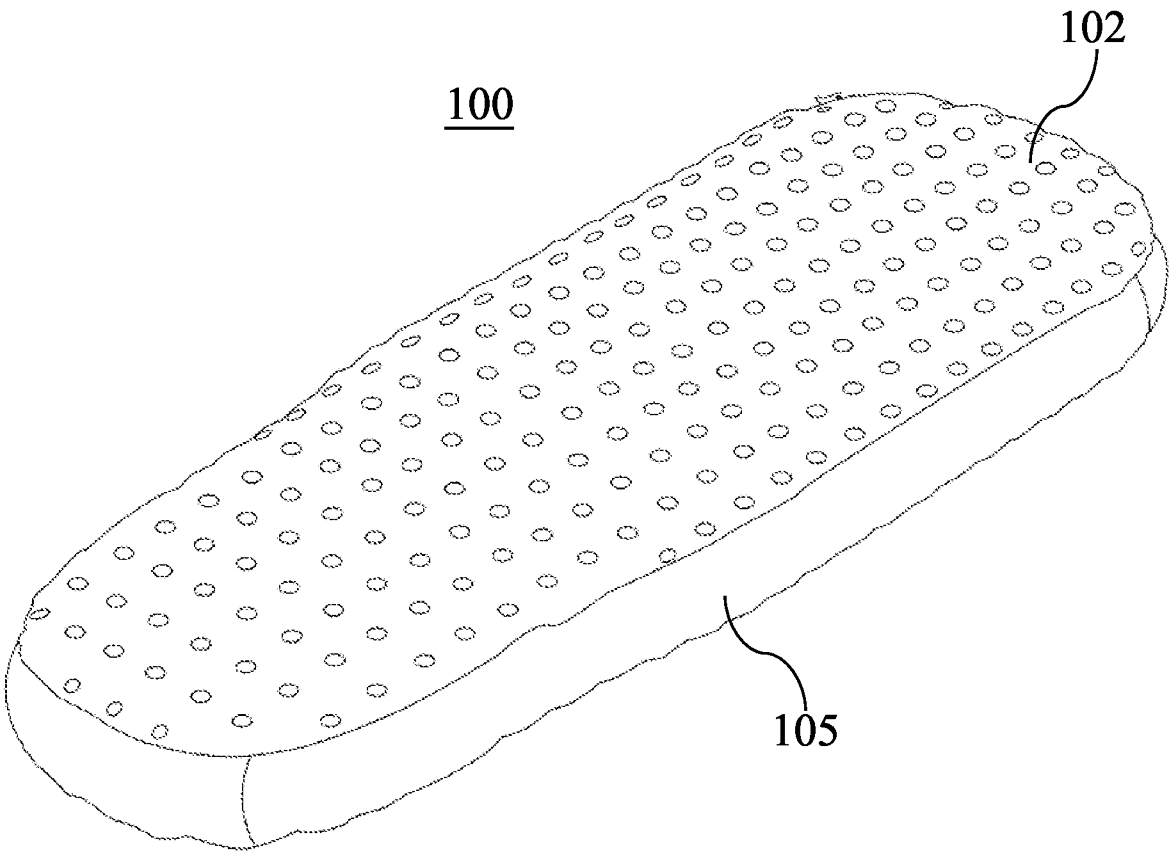
FIG. 15 is a schematic perspective view of an inflatable pad according to an eighth example embodiment.
Figure 16:
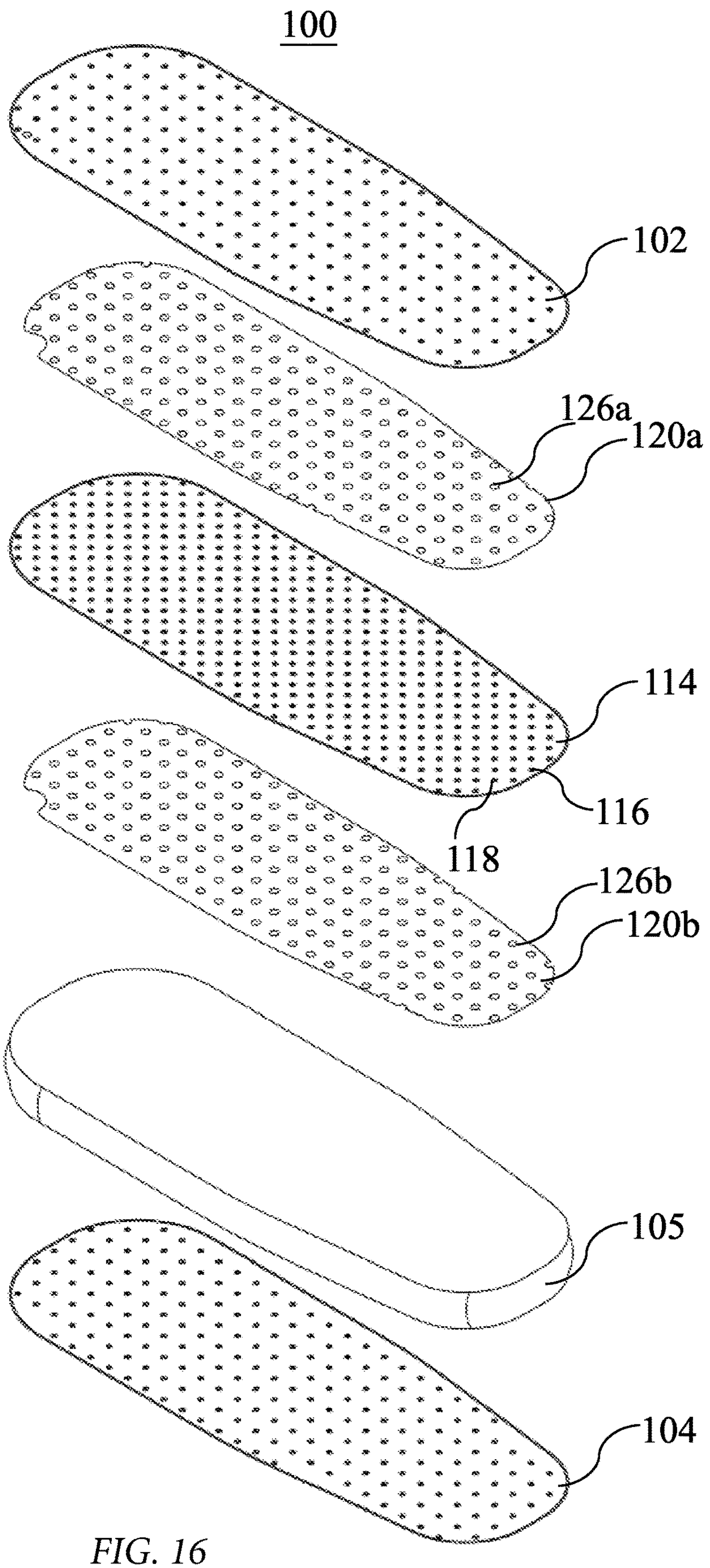
FIG. 16 is a schematic exploded view of an inflatable pad according to the eighth example embodiment.

FIG. 15 and FIG. 16 show an inflatable pad according to an eighth example embodiment. The inflatable pad according to the eighth example embodiment is similar to the inflatable pad according to the above-described second example embodiment, and the main differences there among lie in that the inflatable pad according to the eighth example embodiment further comprises a lateral confining sheet. The main differences among the example embodiments will be introduced below.

With reference to FIG. 15 and FIG. 16, the inflatable pad 100 comprises a top sheet 102, a bottom sheet 104, and a lateral confining sheet 105. The periphery of the top sheet 102 is connected to the periphery of the bottom sheet 104 by means of a lateral confining sheet 105, so that the top sheet 102, the bottom sheet 104 and the lateral confining sheet 105 jointly define an inflatable chamber, therebetween. As shown, the periphery of the top sheet 102 is welded to a top edge of the lateral confining sheet 105, and the periphery of the bottom sheet 104 is welded to a bottom edge of the lateral confining sheet 105. It should be understood that, the lateral confining sheet may be arranged in other example embodiments in the same way.

The top sheet 102 is configured for the user to sit or lie on, and the bottom sheet 104 is configured to be in contact with the ground. The top sheet 102 and the bottom sheet 104 may each comprise an outer layer facing away from the inflatable chamber and an inner layer facing the inflatable chamber. The outer layer may be a fabric layer to provide a comfortable touch. The outer layer may be a non-flocked fabric layer or a flocked fabric layer. The inner layer is a polymer material layer, and can be made of TPU, PVC, PU or other suitable polymer materials. In some variations of the eighth example embodiment, in addition to the outer layer and the inner layer, at least one of the top sheet and the bottom sheet may further comprise a heat insulation film sandwiched between the outer layer and the inner layer, the heat insulation film comprising a polymer substrate and a metal plating layer plated on at least one of a front side and a back side of the polymer substrate. The polymer substrate of the heat insulation film may be made of suitable polymer materials, such as PVC, PP, PET, etc. The metal plating layer of the heat insulation film may be made of suitable metal materials such as aluminum, zinc, copper, silver, or gold. If the heat insulation film is a polymer substrate with single-sided metal plating, the metal plating layer can be chosen to face either the outer layer or the inner layer. The heat insulation film may be bonded to the outer layer and the inner layer with an adhesive to form a multi-layer composite structure.

Optionally, the top sheet 102 and the bottom sheet 104 of the inflatable pad 100 may have the same structure. In this case, each of the top sheet 102 and the bottom sheet 104 comprises an outer layer, an inner layer and a single-sided metal-plated heat insulation film; alternatively, each of the top sheet 102 and the bottom sheet 104 comprises an outer layer, an inner layer and a double-sided metal-plated heat insulation film. Optionally, the top sheet 102 and the bottom sheet 104 of the inflatable pad 100 may also have different structures. In this case, one of the top sheet 102 and the bottom sheet 104 may comprise an outer layer, an inner layer and a single-sided metal-plated or double-sided metal-plated heat insulation film, and the other of the top sheet 102 and the bottom sheet 104 may only comprise an outer layer and an inner layer; alternatively, the top sheet 102 and the bottom sheet 104 may each comprise an outer layer, an inner layer and a single-sided metal-plated or double-sided metal-plated heat insulation film. As an example, one of the top sheet 102 and the bottom sheet 104 comprises a single-sided metal-plated heat insulation film, while the other of the top sheet 102 and the bottom sheet 104 comprises a double-sided metal-plated heat insulation film. As another example, the top sheet 102 and the bottom sheet 104 each comprise a single-sided metal-plated heat insulation film, but the metal plating layers of the heat insulation films of the top sheet 102 and the bottom sheet 104 are plated on different surfaces of the polymer substrate.

With continued reference to FIG. 16, the inflatable pad 100 further comprises a connecting sheet 114. The connecting sheet 114 is arranged within the inflatable chamber between the top sheet 102 and the bottom sheet 104. The connecting sheet 114 may be made of TPU, PVC, PU or other suitable polymer materials. The connecting sheet 114 comprises a plurality of first welding regions 116 and a plurality of second welding regions 118, wherein the plurality of first welding regions 116 and the plurality of second welding regions 118 are staggered with respect to each other, the plurality of first welding regions 116 are welded to the inner layer of the top sheet 102, and the plurality of second welding regions 118 are welded to the inner layer of the bottom sheet 104.

The inflatable pad 100 further comprises heat insulation sheets including a first heat insulation sheet 120*a* and a second heat insulation sheet 120*b*. The first heat insulation sheet 120*a* and the second heat insulation sheet 120*b* each comprise a polymer substrate and two metal plating layers respectively plated on a front side and a back side of the polymer substrate. The polymer substrate of the heat insulation sheet may be made of suitable polymer materials, such as PVC, PP, PET, etc. The metal plating layer of the heat insulation sheet may be made of suitable metal materials such as aluminum, zinc, copper, silver, or gold. In some variations, the first heat insulation sheet 120*a* and/or the second heat insulation sheet 102*b* may comprise a polymer substrate and only one metal plating layer respectively plated on a front side or a back side of the polymer substrate.

The first heat insulation sheet 120*a* is arranged within the inflatable chamber between the top sheet 102, and the connecting sheet 114, and the second heat insulation sheet 120*b* is arranged within the inflatable chamber between the connecting sheet 114 and the bottom sheet 104. The first heat insulation sheet 120*a* comprises a plurality of first openings 126*a*, each first opening 126*a* being configured to allow a corresponding first welding region 116 of the connecting sheet 114 to be in contact with and welded to the top sheet 102. The second heat insulation sheet 120*b* comprises a plurality of second openings 126*b*, each second opening 126*b* being configured to allow a corresponding second welding region 118 of the connecting sheet 114 to be in contact with and welded to the bottom sheet 104. In this way, a plurality of first welding regions 116 of the connecting sheet 114 may be in contact with and welded to the top sheet 102 through the plurality of first openings 126*a*, and a plurality of second welding regions 118 of the connecting sheet 114 may be in contact with and welded to the bottom sheet 104 through the plurality of second openings 126*b*.

As shown, one first heat insulation sheet 120*a* is arranged between the top sheet 102 and the connecting sheet 114, and one second heat insulation sheet 120*b* is arranged between the connecting sheet 114 and the bottom sheet 104. It should be understood that, alternately, two or more first heat insulation sheets may also be arranged between the top sheet and the connecting sheet, and two or more second heat insulation sheets may also be arranged between the connecting sheet and the bottom sheet. It should also be understood that, alternately, the inflatable pad may include only one or more heat insulation sheets between the top sheet and the connecting sheet, the one or more heat insulation sheets comprising a plurality of openings, each opening being configured to allow a corresponding first welding region of the connecting sheet to be in contact with and welded to the top sheet. Still further, the inflatable pad may include only one or more heat insulation sheets between the bottom sheet and the connecting sheet, the heat insulation sheets comprising a plurality of openings, each opening being configured to allow a corresponding second welding region of the connecting sheet to be in contact with and welded to the bottom sheet.

It should also be understood that, the lateral confining sheet according to this example embodiment may also be arranged in other example embodiments in the same way.

Compared with an option of arranging a single-sided aluminum-plated film within an inflatable chamber, since the heat insulation film with the metal plating layer of the inflatable pad according to one or more example embodiments may be sandwiched between the outer layer and the inner layer of the top sheet and/or the outer layer and the inner layer of the bottom sheet, the metal plating layer of the heat insulation film does not hinder the welding between the top sheet and the bottom sheet and the connecting sheet or the direct welding between the top sheet and the bottom sheet, thus there is no requirement to perforate the heat insulation film. In other words, with an inflatable pad according to one or more example embodiments described herein, the heat insulation film with the metal plating layer may aid in improving the heat insulation performance of the inflatable pad, and the problem of a plurality of single-sided aluminum-plated films becoming stuck and difficult to be separated at the perforations due to a perforating operation may be prevented, thereby improving the production efficiency and yield of the inflatable pad.

As described herein, unless expressly stated or limited otherwise, the terms such as "mounting," "connecting," "connection," and "fixing" should be interpreted broadly, for example, either fixed or detachable connection, or integration; may be a direct connection or an indirect connection by means of an intermediate medium, and may be communication between the interiors of two elements or the interaction relationship of the two elements, unless otherwise expressly defined. For those of ordinary skill in the art, the specific meaning of the terms used herein should be construed according to specific circumstances.

It should also be understood that the components and features described herein can be made of any of a variety of materials including, but not limited to, polymer, rubber, metal, and other suitable materials well known to those skilled in the art or a combination thereof. The example embodiments shown in FIG. 2 through FIG. 16 only show the shapes, dimensions and arrangements of various optional components of an inflatable pad, which are merely illustrative but not limiting, and other shapes, dimensions and arrangements may be employed. Those skilled in the art can easily make modifications, variations, and equivalents of these example embodiments on the basis of the disclosed content. For example, the illustrated or described features as part of an example embodiment can be used with another example embodiment to provide a further example embodiment.

It should be understood that those skilled in the art can make variations and improvements to the concepts described above. The descriptions included herein are illustrative rather than restrictive.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. An inflatable pad comprising:
a top sheet;
a bottom sheet connected to the top sheet;
an inflatable chamber defined by the top sheet and the bottom sheet;
wherein each of the top sheet and the bottom sheet comprises a multi-layer composite structure, and the multi-layer composite structure includes:
an outer layer comprising a fabric layer facing away from the inflatable chamber,
an inner layer facing the inflatable chamber, the inner layer comprising a polymer material layer, and
a heat insulation film disposed between the outer layer and the inner layer, the heat insulation film comprising a polymer substrate and a metal plating layer plated on the polymer substrate;
wherein the outer layer, the inner layer, and the heat insulation film of the multi-layer composite structure form an integral structure in which the heat insulation film is bonded to each of the outer layer and the inner layer.

2. The inflatable pad according to claim 1, further comprising:
a connecting sheet disposed within the inflatable chamber between the top sheet and the bottom sheet, the connecting sheet comprising:
a plurality of first welding regions and a plurality of second welding regions staggered with respect to the plurality of first welding regions,
wherein the plurality of first welding regions are welded to the top sheet and the plurality of second welding regions are welded to the bottom sheet.

3. The inflatable pad according to claim 2, further comprising:
at least one heat insulation sheet disposed within the inflatable chamber,
wherein the heat insulation sheet comprises a polymer substrate and a metal plating layer plated on the polymer substrate.

4. The inflatable pad according to claim 3, wherein:
the at least one heat insulation sheet comprises a first heat insulation sheet and a second heat insulation sheet;
wherein the first heat insulation sheet is disposed between the top sheet and the connecting sheet and comprises a plurality of first openings, wherein each of the plurality first openings is configured to allow a corresponding one of the plurality of first welding regions to be in contact with and welded to the top sheet; and
wherein the second heat insulation sheet is disposed between the connecting sheet and the bottom sheet and comprises a plurality of second openings, wherein each of the plurality of second openings is configured to allow a corresponding one of the plurality of second welding regions to be in contact with and welded to the bottom sheet.

5. The inflatable pad according to claim 1, wherein the metal plating layer comprises a first metal plating layer plated on a front side of the polymer substrate and a second metal plating layer plated on a back side of the polymer substrate.

6. The inflatable pad according to claim 5, wherein:
the polymer substrate is made of one of polyvinyl chloride, polypropylene, and polyethylene terephthalate; and
the metal plating layer is made of one of aluminum, zinc, copper, silver, and gold.

7. The inflatable pad according to claim 1, further comprising:
a lateral confining sheet;
wherein a periphery of the top sheet is connected to a top edge of the lateral confining sheet, and a periphery of the bottom sheet is connected to a bottom edge of the lateral confining sheet, such that the bottom sheet is connected to the top sheet via the lateral confining sheet, and the top sheet, the bottom sheet, and the lateral confining sheet jointly define the inflatable chamber therebetween.

8. The inflatable pad according to claim 1, wherein the top sheet and the bottom sheet each comprise the outer layer and the inner layer, and the inner layer of the top sheet and the inner layer of the bottom sheet are made of the same polymer material.

9. The inflatable pad according to claim 2, wherein the top sheet and the bottom sheet each comprise the outer layer and the inner layer, and the inner layer of the top sheet, the inner layer of the bottom sheet, and the connecting sheet are made of the same polymer material.

10. An inflatable pad comprising:
a top sheet;
a bottom sheet connected to the top sheet;
an inflatable chamber defined by the top sheet and the bottom sheet;
a connecting sheet disposed within the inflatable chamber and comprising:
a plurality of first welding regions welded to an inner layer of the top sheet; and
a plurality of second welding regions welded to an inner layer of the bottom sheet;
wherein the plurality of first welding regions and the plurality of second welding regions are distributed in an array across the connecting sheet, such that the plurality of second welding regions are staggered with respect to the plurality of first welding regions; and
wherein at least one heat insulation sheet is disposed within the inflatable chamber and comprising a polymer substrate and a metal plating layer plated on the polymer substrate.

11. The inflatable pad according to claim 10, wherein the connecting sheet further comprises a plurality of lightening holes which are staggered with respect to both the plurality of first welding regions and the plurality of second welding regions.

12. An inflatable pad, comprising:
a top sheet;
a bottom sheet connected to the top sheet;
an inflatable chamber defined by the top sheet and the bottom sheet;
a connecting sheet disposed within the inflatable chamber; and
a first heat insulation sheet and a second heat insulation sheet disposed within the inflatable chamber, each of the first heat insulation sheet and the second heat insulation sheet comprising:
a polymer substrate including a front side and a back side;
a first metal plating layer plated on a front side of the polymer substrate; and a second metal plating layer plated on the back side of the polymer substrate;

wherein the first heat insulation sheet is arranged between the connecting sheet and the top sheet, the second heat insulation sheet is arranged between the connecting sheet and the bottom sheet, and the first heat insulation sheet includes a plurality of openings configured to allow the connecting sheet to be welded to the top sheet.

13. The inflatable pad according to claim 12, wherein the connecting sheet includes a plurality of first welding regions and a plurality of second welding regions staggered with respect to the plurality of first welding regions, wherein the plurality of first welding regions are welded to the top sheet, and the plurality of second welding regions are welded to the bottom sheet.

14. The inflatable pad according to claim 13, wherein:

the second heat insulation sheet comprises a plurality of openings, wherein each of the plurality of openings is configured to allow a corresponding one of the plurality of second welding regions to be in contact with and welded to the bottom sheet.

15. The inflatable pad according to claim 13, wherein each of the top sheet and the bottom sheet comprises:

an outer layer comprising a fabric layer facing away from the inflatable chamber; and an inner layer facing the inflatable chamber;

wherein each of the inner layer of the top sheet, the inner layer of the bottom sheet, and the connecting sheet is made of a same polymer material.

16. The inflatable pad according to claim 12, further comprising:

a lateral confining sheet;

wherein a periphery of the top sheet is connected to a top edge of the lateral confining sheet, and a periphery of the bottom sheet is connected to a bottom edge of the lateral confining sheet, such that the top sheet, the bottom sheet, and the lateral confining sheet jointly define the inflatable chamber therebetween.

17. The inflatable pad according to claim 12, wherein:

the polymer substrate is made of one of polyvinyl chloride, polypropylene, and polyethylene terephthalate; and the metal plating layer is made of one of aluminum, zinc, copper, silver, and gold.

18. The inflatable pad according to claim 12, wherein at least one of the first heat insulation sheet and the second heat insulation sheet has a thickness of 5 micrometers to 50 micrometers.

19. The inflatable pad according to claim 3, wherein the at least one heat insulation sheet is disposed between the top sheet and the connecting sheet and comprises a plurality of openings, wherein each of the plurality of openings is configured to allow a corresponding one of the plurality of first welding regions to be in contact with and welded to the top sheet.

20. The inflatable pad according to claim 10, wherein the at least one heat insulation sheet is disposed between the top sheet and the connecting sheet and comprises a plurality of openings, wherein each of the plurality of openings is configured to allow a corresponding one of the plurality of first welding regions to be in contact with and welded to the top sheet.

21. The inflatable pad according to claim 10, wherein the connecting sheet are made of one of a thermoplastic polyurethane elastomer material, a polyvinyl chloride material, and a polyurethane material.

22. The inflatable pad according to claim 10, wherein the metal plating layer comprises a first metal plating layer plated on a front side of the polymer substrate and a second metal plating layer plated on a back side of the polymer substrate.

23. The inflatable pad according to claim 10, wherein the polymer substrate is made of one of polyvinyl chloride, polypropylene, and polyethylene terephthalate; and the metal plating layer is made of one of aluminum, zinc, copper, silver, and gold.

24. The inflatable pad according to claim 23, wherein the metal plating layer has a thickness of 100 angstroms to 800 angstroms.

25. The inflatable pad according to claim 10, further comprising:

a lateral confining sheet;

wherein a periphery of the top sheet is connected to a top edge of the lateral confining sheet, and a periphery of the bottom sheet is connected to a bottom edge of the lateral confining sheet, such that the bottom sheet is connected to the top sheet via the lateral confining sheet, and the top sheet, the bottom sheet, and the lateral confining sheet jointly define the inflatable chamber therebetween.

26. The inflatable pad according to claim 17, wherein the metal plating layer has a thickness of 100 angstroms to 800 angstroms.

27. The inflatable pad according to claim 10, wherein a first gap is formed between a periphery of the connecting sheet and a periphery of the top sheet and a second gap is formed between the periphery of the connecting sheet and a periphery of the bottom sheet.

28. The inflatable pad according to claim 10, wherein a periphery of the connecting sheet, a periphery of the top sheet, and a periphery of the bottom sheet are welded to one another, such that the inflatable chamber defines a first inflatable formed between the connecting sheet and the top sheet and a second inflatable chamber formed between the connecting sheet and the bottom sheet, and the first inflatable chamber and the second inflatable chamber are in fluid communication via a plurality of communication holes formed in the connecting sheet.

* * * * *